(12) United States Patent
Nakazima et al.

(10) Patent No.: US 6,360,497 B1
(45) Date of Patent: Mar. 26, 2002

(54) PHOTOVOLTAIC CELL MODULE TILE

(75) Inventors: Ichiro Nakazima, Nara; Teruki Hatsukaiwa, Otsu; Fumihiro Tanigawa, Settsu; Takuji Nomura, Otsu; Isao Yoshida, Tokushima; Kazuhito Hirai, Tokushima, all of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/619,366

(22) Filed: Jul. 19, 2000

(30) Foreign Application Priority Data

| Jul. 21, 1999 | (JP) | 11-206201 |
| Jul. 21, 1999 | (JP) | 11-206203 |
| Jul. 21, 1999 | (JP) | 11-206204 |
| Aug. 10, 1999 | (JP) | 11-226342 |
| Dec. 20, 1999 | (JP) | 11-361154 |
| Jun. 9, 2000 | (JP) | 12-173897 |

(51) Int. Cl.$^7$ .............................................. E04D 13/18
(52) U.S. Cl. ..................... 52/173.3; 126/622; 136/251; 136/291
(58) Field of Search ................... 52/173.3; 126/621, 126/622; 136/244, 251, 291

(56) References Cited

U.S. PATENT DOCUMENTS 5,768,831 A * 6/1998 Melchior ................... 52/173.3

FOREIGN PATENT DOCUMENTS

| JP | 62-52610 | 4/1987 |
| JP | 1-148417 | 10/1989 |
| JP | 4-28524 | 3/1992 |
| JP | 5-3430 | 1/1993 |
| JP | 10-088739 | 4/1998 |
| JP | 10-088741 | 4/1998 |
| JP | 10-317592 | 12/1998 |
| JP | 11-001999 | 1/1999 |

* cited by examiner

Primary Examiner—Carl D. Friedman
Assistant Examiner—Naoko Slack
(74) Attorney, Agent, or Firm—Hogan & Hartson, LLP.

(57) ABSTRACT

The upper surface of a tile body for use as a roofing material for a building is provided with a depression that holds therein a photovoltaic cell module having a function to convert solar energy into electrical energy. An adhesive is applied to the whole or part of the base of the depression, and the photovoltaic cell module, which has a terminal box on its lower surface, is fixed to the base of the depression by adhesive bonding.

17 Claims, 18 Drawing Sheets

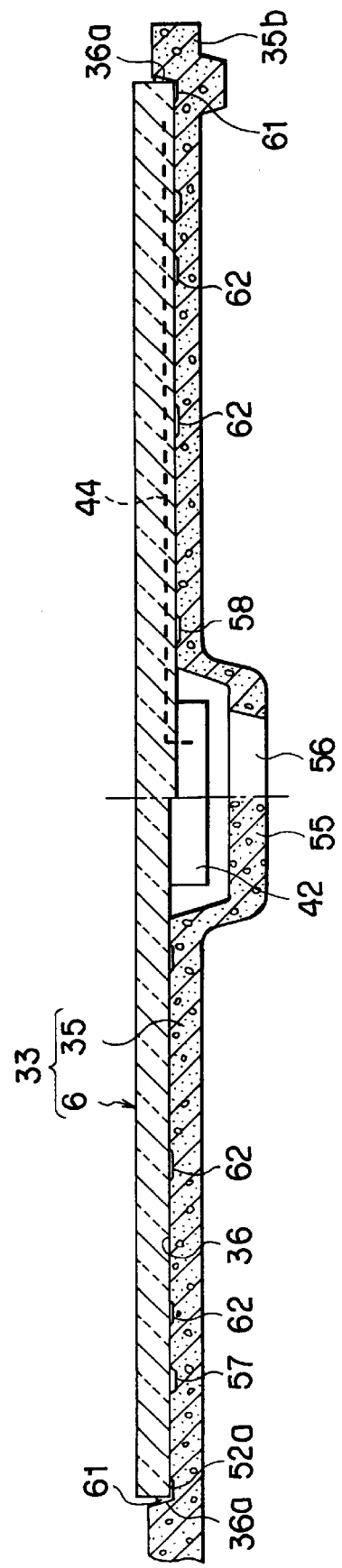

PHOTOVOLTAIC CELL MODULE TILE

CROSS-REFERENCE TO RELATED APPLICATIONS

This application is based upon and claims the benefit of priority from the prior Japanese Patent Applications No. 11-206201, filed Jul. 21, 1999; No. 11-206203, filed Jul. 21, 1999; No. 11-206204, filed Jul. 21, 1999; No. 11-226342, filed Aug. 10, 1999; No. 11-361154, filed Dec. 20, 1999; and No. 2000-173897, filed Jun. 9, 2000, the entire contents of which are incorporated herein by reference.

BACKGROUND OF THE INVENTION

The present invention relates to a photovoltaic cell module tile composed of a tile used as a roofing material for a building and a photovoltaic cell module mounted thereon.

According to techniques described in Jpn. UM Appln. KOKAI Publications Nos. 62-52610, 1-148417, 4-28524, and 5-3430, Jpn. Pat. Appln. KOKAI Publication No. 11-1999, etc., a photovoltaic cell is mounted on a tile for use as a roofing material for a building, and solar energy is converted into electricity for practical use.

In the example described in Jpn. UM Appln. KOKAI Publications No. 62-52610, a depression in a shape that fits photovoltaic cells is provided in the upper surface of a sheathing material for tiles and outer walls, and the photovoltaic cells are set in the depression.

In the example described in Jpn. UM Appln. KOKAI Publication No. 1-148417, a photovoltaic cell is located on the surface of the lower part of a flat tile, and lead wires of the cell are led out through spaces on the reverse side of the opposite ends of the upper edge of the tile.

In the example described in Jpn. UM Appln. KOKAI Publication No. 5-3430, a photovoltaic cell is bonded to the surface of a tile, and an opaque sheet is separably attached close to the surface of the cell so that it can protect the cell during tiling operation.

In the example described in Jpn. Pat. Appln. KOKAI Publication No. 11-1999, a silicone-based adhesive is used to bond a silicone-based waterproof gasket to the inside of side edges of a photovoltaic cell on the reverse side thereof.

In bonding a photovoltaic cell to a tile body, an adhesive is applied to the tile body, and the cell, with its second surface downward, is pressed against the resulting adhesive layer. It takes several hours to set the adhesive. If the tile body is moved before the adhesive sets, the photovoltaic cell may possibly be dislocated or lifted. Accordingly, the tile body should be kept stationary until the adhesive set.

In a process for continuously transporting tile bodies by means of a conveyor for mass production and bonding photovoltaic cells individually to the tile bodies during the transportation, each photovoltaic cell is pressed against a layer of an adhesive to be bonded thereto after the adhesive is applied to each tile body. Since the photovoltaic cell is liable to be dislocated before the adhesive sets, however, the photovoltaic cell cannot be transported or can be transported only slowly to the next process, e.g., a caulking process, before the adhesive sets. Thus, satisfactory productivity cannot be enjoyed.

Further, there is a difference in thermal expansion coefficient between the tile body and the photovoltaic cell, and the adhesive may crack due to aging, in some cases. Once a crack is produced, it gradually spreads to cause defective bonding, so that the photovoltaic cell may possibly slip off, thus lacking in reliability.

In a tile of the conventional photovoltaic-cell type, as mentioned before, a photovoltaic cell is fixed directly to a tile body by bonding with an adhesive.

This photovoltaic cell attachment structure is only tight enough to prevent dislocation of a photovoltaic cell module with respect to the tile body at the least. Moreover, lowering of adhesion on the interface between the adhesive and the photovoltaic cell or between the adhesive and the tile is a more serious problem than the aging of the adhesive itself is. If the photovoltaic cell is fanned by a strong wind, it cannot be prevented from lifting, in some cases.

As is described in Jpn. Pat. Appln. KOKAI Publications Nos. 10-88739 or 10-317592, there has been developed a technique that uses a substantially L-shaped metallic fixture besides the adhesive.

More specifically, a part of the L-shaped fixture is fixed to a tile body so that its bent end portion presses down a photovoltaic cell that is fitted in a depression, thereby preventing the cell from lifting off the tile.

However, the fixture is fixed to the tile body. If the fixture restrains the photovoltaic cell from lifting, therefore, all its force is inevitably concentrated on the spot of attachment of the fixture to the tile body, possibly resulting in rupture.

Further, the metallic fixture must be manufactured separately, and fixing the fixture to the tile body and pressing down the photovoltaic cell by means of the fixture require time and labor, inevitably exerting a bad influence upon the cost.

Some photovoltaic cell modules are held in a depression in the upper surface of a tile body. One such module is adhesively bonded to the depression with an adhesive or caulking material or a combination of these materials. Under severe working conditions, such as ones on a roof that is exposed to the heat of the sunlight and the weather, the caulking material or the like may possibly be lowered in quality, so that rainwater may be allowed to get into the depression.

To improve these situations, a novel system is proposed and described in Jpn. Pat. Appln. KOKAI Publication No. 10-88741. According to this system, a photovoltaic cell module is held in a depression in a flat tile, and through holes that open to the reverse side of the flat tile are formed in the lower peripheral edges of the tile so that rainwater in the depression can be discharged to the reverse side of the tile through the through holes.

As mentioned before, however, the rainwater that is discharged to the reverse side of the flat tile through the through holes is received by a directly underlying flat tile and is discharged along the gradient of the tiles. Possibly, therefore, dust or the like may collect in gaps between the overlapping flat tiles and substantially prevent the drainage through the through holes. In this case, there is a high possibility of the rainwater getting into a terminal box for output fetching that is provided on the second surface of the photovoltaic cell module. This problem must be solved in order to ensure reliability in prolonged use.

BRIEF SUMMARY OF THE INVENTION

The object of the present invention is to provide a high-reliability photovoltaic cell module tile in which a photovoltaic cell module can be securely fixed to a tile body.

According to the present invention, there is provided a photovoltaic cell module tile comprising a tile body, a depression provided on the upper surface of the tile body, and a photovoltaic cell module having a terminal box on the lower surface thereof fixed to the base of the depression with an adhesive applied thereto.

According to the invention, moreover, there is provided a photovoltaic cell module tile comprising a tile body, a depression provided in the upper surface of the tile body, and a photovoltaic cell module having a terminal box on the lower surface thereof fixed to the base of the depression by means of a double-coated tape and an adhesive.

According to the invention, furthermore, there is provided a photovoltaic cell module tile comprising a tile body, a depression provided on the upper surface of the tile body, an adhesive pit provided in the depression, a groove continuously extending along at least the upper edge and the opposite side edges of the base of the depression, and a photovoltaic cell module fixedly bonded to the depression in a manner such that an adhesive is applied to the adhesive pit and a sealant is loaded into the groove.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 36 is a sectional view taken along line V—V of FIG. 32A.

DETAILED DESCRIPTION OF THE INVENTION

Various embodiments of the present invention will now be described with reference to the accompanying drawings.

Figure 1:
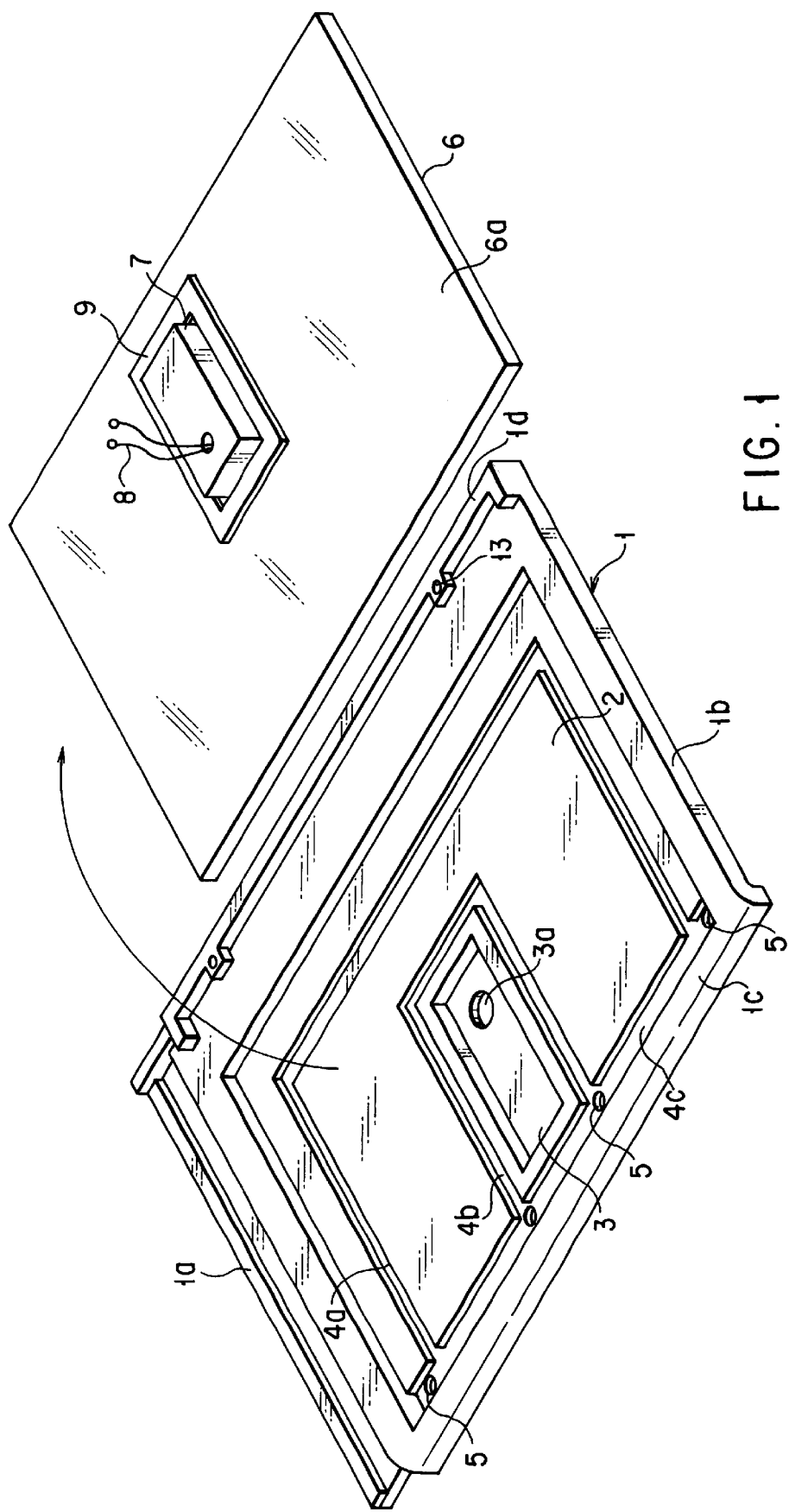
FIG. 1 is an exploded perspective view of a photovoltaic cell module tile according to a first embodiment of the present invention.
Figure 2:
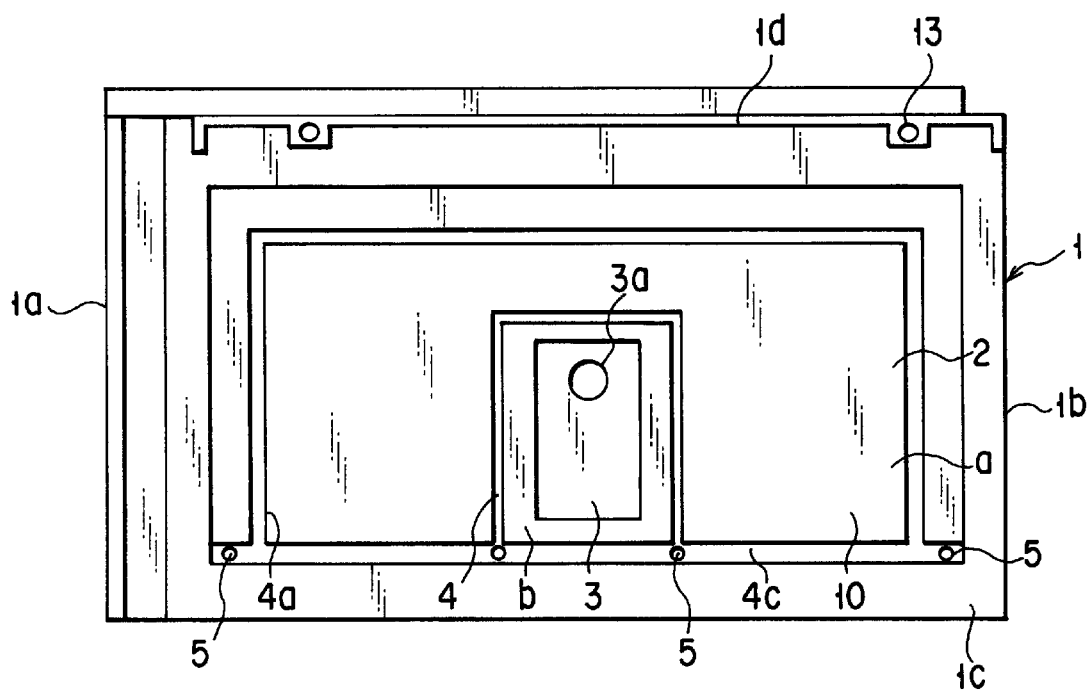
FIG. 2 is a plan view of a tile body according to the first embodiment.
Figure 3:
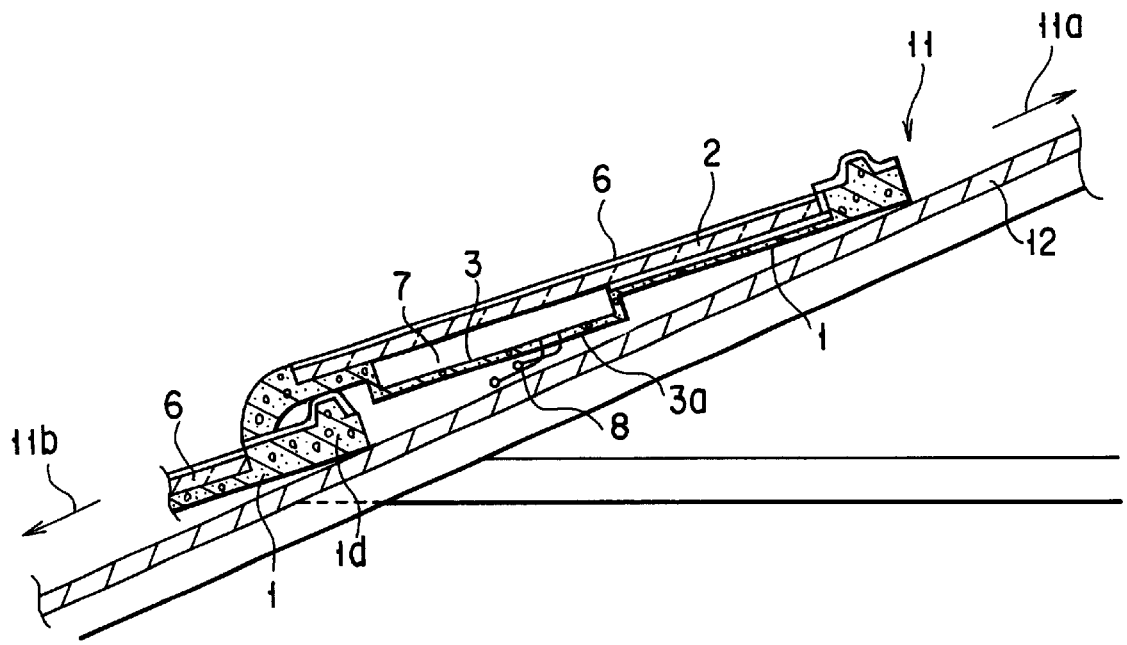
FIG. 3 is a profile showing the way the photovoltaic cell module tile of the first embodiment is laid.
Figure 4:
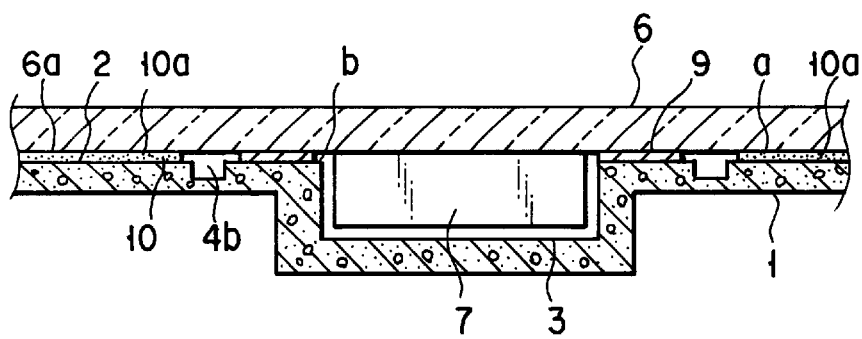
FIG. 4 is a side profile showing a part of the photovoltaic cell module tile of the first embodiment.

FIGS. 1 to 4 show a first embodiment, in which FIG. 1 is an exploded perspective view of a photovoltaic cell module tile, FIG. 2 is a plan view of a roofing tile body, FIG. 3 is a profile showing the way the photovoltaic cell module tile is laid, and FIG. 4 is a side profile showing a part of the photovoltaic cell module tile.

As shown in FIGS. 1 and 2, a roofing tile body 1 is a rectangular flat plate that is formed of, for example, a cement tile, clay tile, or metallic tile. Overlap portions 1a and 1b are formed individually on the opposite side portions of the tile body 1. The overlap portions 1a and 1b can mate with laterally adjacent tile bodies 1, individually. A front hanging portion 1c is provided on the second surface of the lower end portion of the tile body 1, and a rear rising portion 1d on the first surface of the upper end portion. The front hanging portion 1c is designed to be lapped on the upper surface of another tile body 1 on the lower end side, and the rear rising portion 1d on the lower surface of another tile body 1 on the upper end side.

A rectangular depression 2 for use as a mounting portion is provided substantially over the whole upper surface of the tile body 1. The depression 2 has a depth a little greater than the thickness of a photovoltaic cell module. A rectangular terminal box storage recess 3 is provided in a substantially central portion of the depression 2.

A cable outlet hole 3a is bored through the bottom of the terminal box storage recess 3 in a position deviated on the upper end side of the tile body 1. Further, the second surface of the recess 3 is substantially flush with the front hanging portion 1c of the tile body 1 so that the tile body 1 can be placed on a roof with stability.

A U-shaped first waterway 4a is formed in the base of the depression 2. It continuously extends along the top side and opposite lateral sides of the depression 2. A U-shaped second waterway 4b is formed in the central portion of the base of the depression 2. It continuously extends surrounding the terminal box storage recess 3. At the corner of the lower side of the depression 2, moreover, a third waterway 4c laterally extends throughout the length of the depression 2. The first and second waterways 4a and 4b communicate with the third waterway 4c. Thus, water that flows in the first and second waterways 4a and 4b can collect in the third waterway 4c.

Further, through holes or drainage holes 5 are bored individually through four portions, including the opposite end portions of the third waterway 4c and junctions between the second and third waterways 4b and 4c. The drainage holes 5 penetrate the tile body 1.

The depression 2 for use as the mounting portion for the tile body 1 constructed in this manner has a size that matches the dimensions of a photovoltaic cell module 6. The photovoltaic cell module 6 is held in the depression 2. For example, the photovoltaic cell module 6 may be a rectangular sheet panel that is obtained by forming a transparent electrode layer, amorphous semiconductor layer, and back electrode layer on one glass substrate and sealing the second surface of the resulting structure by means of a sealer for insulation, waterproofing, etc. Although the amorphous semiconductor layer is suitably used as the semiconductor layer, a single-crystal, polycrystalline, or microcrystalline silicon- or compound-based layer may be used instead.

As shown in FIGS. 1 and 3, a terminal box 7 is fixed to a substantially central portion of a second surface 6a of the photovoltaic cell module 6, and output cables 8 are connected to the box 7. The terminal box 7 is held in the terminal box storage recess 3 of the tile body 1, and the cables 8 are led out to the backside of the tile body 1 through the cable outlet hole 3a.

A double-coated tape 9 with a thickness of 0.5 to 1.0 mm and an adhesive 10 are used as means for fixing the photovoltaic cell module 6 to the depression 2 of the tile body 1. The adhesive 10 is applied substantially to the whole surface (indicated by hatching a in FIG. 2) of the depression 2 of the tile body 1, thereby forming an adhesive layer 10a. Further, the tape 9 is stuck like a rectangular frame to that portion of the second surface of the module 6 which corresponds to an outer peripheral portion (indicated by hatching b in FIG. 2) of the terminal box storage recess 3 that is surrounded by the second waterway 4b.

The adhesive 10 may be formed of a silicone-, silicon-, or epoxy-based resin, for example. If an elastic adhesive (silicone- or silicon-based), which remains elastic after it is set, is used for the purpose, it can absorb the difference in thermal expansion coefficient between the tile body 1 and the photovoltaic cell module 6, thereby maintaining the bond performance for a long period of time. Further, a silicon-loaded polyisobutylene-based adhesive may be given as an example of the silicon-based adhesive.

If the second surface 6a of the photovoltaic cell module 6 is then pressed downward against the adhesive layer 10a of the depression 2 of the tile body 1 after cover tapes of the double-coated tape 9 are separated, as shown in FIG. 4, it is bonded to the adhesive layer 10a indicated by the hatching a, and the tape 9 is stuck to the portion indicated by the hatching b.

It takes several hours to set the adhesive layer 10a. Since the photovoltaic cell module 6 is tacked to the tile body 1 by means of the double-coated tape 9, however, it cannot be dislocated if the tile body 1 that carries it thereon is moved. Thus, the module 6 can be transferred to the next stage by means of a conveyor or the like in a production line for photovoltaic cell module tiles.

The double-coated tape 9 is stuck to the outer peripheral portion of the terminal box storage recess 3 that is surrounded by the second waterway 4b, and its thickness ranges from 0.5 to 1.0 mm. Thus, the tape 10 serves as a gasket that can prevent rainwater having entered the depression 2 from flowing into the terminal box storage recess 3.

The following is a description of tiling operation in which the photovoltaic cell module tiles with the aforementioned construction are laid on a roof of a building. As shown in FIG. 3, a roof 11 is provided with a sheathing 12 that declines from a ridgeline side 11a toward an eave side 11b. The photovoltaic cell module tiles are laid over the sheathing 12 directly or with a tile ground between them.

The photovoltaic cell module tiles are laid successively over the sheathing 12 from the eave side 11b toward the ridgeline side 11a as in the case of conventional tiling operation. Each two laterally adjacent tile bodies 1 are arranged so that their overlap portions 1a and 1b mate with each other, and are fixed to the sheathing 12 by means of nails that are passed through mounting holes 13 (see FIGS. 1 and 2) on the upper end portion of each tile body 1. The hanging portion 1c of the tile body 1 on the upper-row side is lapped on the upper part of the rear rising portion 1d of the tile body 1 on the lower-row side, and the drainage holes 5 of the tile body 1 on the upper-row side are situated below the rear rising portion 1d of the tile body 1 on the lower-row side (or on the eave side 11b). Likewise, the tile body 1 on the upper-row side is fixed to the sheathing 12 by means of nails that are passed through the mounting holes 13.

The roof 11 can be formed by repeatedly laying the photovoltaic cell module tiles in the same manner as aforesaid. During this tiling operation, the output cables 8 led out of the terminal box 7 are connected in series or parallel with each other, whereupon a plurality of photovoltaic cell modules 6 can be connected electrically to one another.

In the first embodiment described above, the depression 2 of the tile body 1 is provided with the waterways 4a to 4c, and the waterway 4c is provided with the drainage holes 5 that penetrate the tile body 1. Alternatively, however, waterways that communicate with the depression 2 may be formed by partially or wholly cutting the lower edge portion of the tile body 1 so that rainwater can be discharged through the waterways.

Figure 5:
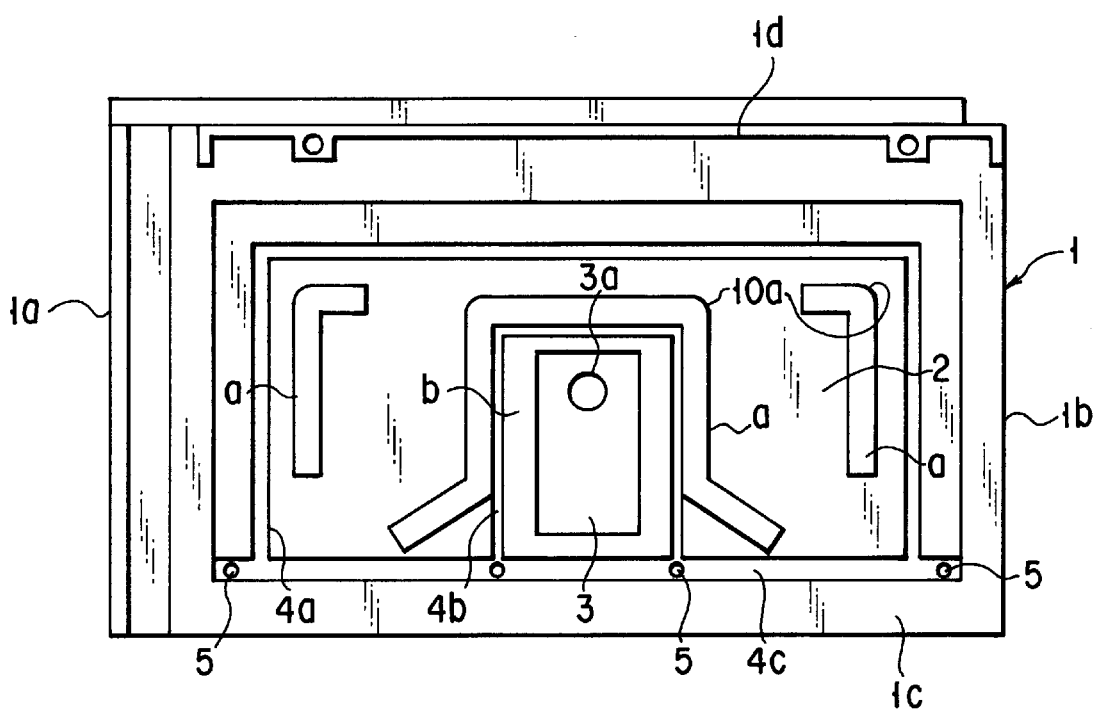
FIG. 5 is a plan view of a tile body according to a second embodiment of the invention.

FIG. 5 shows a second embodiment. According to the first embodiment, the adhesive layer 10a is formed by applying the adhesive 10 to the substantially whole surface of the depression 2 of the tile body 1. According to the present invention, however, adhesive layers 10a may be formed by partially applying an adhesive 10 to a depression 2 of a tile body 1, as indicated by hatching a in FIG. 5. As in the first embodiment, a double-coated tape 9 is stuck to an outer peripheral portion of a terminal box storage recess 3 that is surrounded by a second waterway 4b. The tape 9 serves as a gasket that can prevent rainwater having entered the depression 2 from flowing into the storage recess 3.

Figure 6:
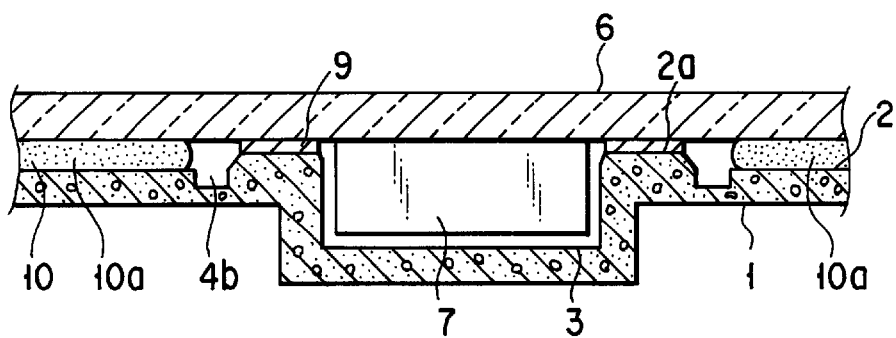
FIG. 6 is a front profile showing a part of a tile body according to a third embodiment of the invention.

FIG. 6 shows a third embodiment. According to the first embodiment, the double-coated tape 9 is stuck to the outer peripheral portion of the terminal box storage recess 3 that is surrounded by the second waterway 4b, the outer peripheral portion being flush with the base of the depression 2. According to the present embodiment, however, an outer peripheral portion of a terminal box storage recess 3 that is surrounded by a second waterway 4b forms a projection 2a. In this case, penetration of rainwater can be prevented by means of both the projection 2a and a double-coated tape 9 that is stuck to the projection 2a.

Figure 7:
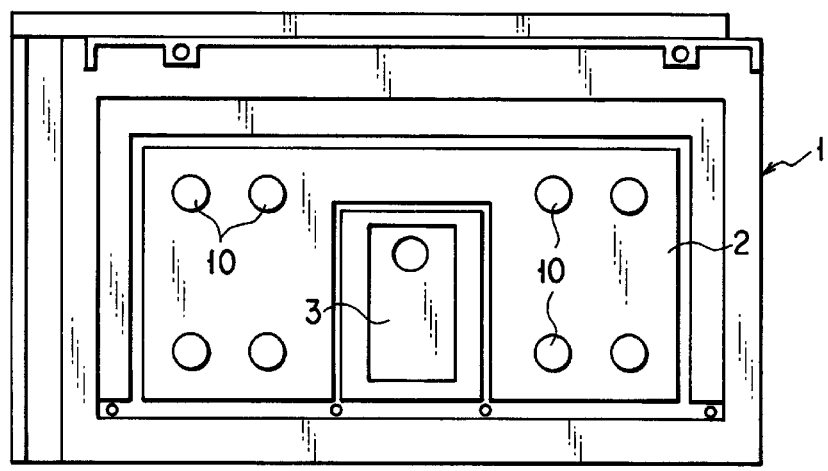
FIG. 7 is a plan view of a tile body according to a fourth embodiment of the invention.

FIG. 7 shows a fourth embodiment. In the description of the fourth embodiment to follow, like reference numerals are used to designate the same components of the first embodiment, and a description of those components is omitted. According to the present embodiment, a photovoltaic cell module 6 is fixedly bonded to a depression 2 of a tile body 1 by means of an adhesive 10 only.

Substantially circular beads of the adhesive 10 are applied to eight spots of the depression 2 that are located symmetrically with respect to horizontal and vertical center lines O, and the photovoltaic cell module 6 is pressed against the depression 2 for spot bonding. The eight beads of the adhesive 10 are arranged at spaces such that they never touch one another if the module 6 is pressed against the depression 2. After the adhesive 10 is set, the module 6 is fixed by means of the eight beads.

The adhesive 10, like the one according to the first embodiment, may be formed of a silicone-, silicon-, or epoxy-based resin. If an elastic adhesive (silicone- or silicon-based), which remains elastic after it is set, is used for the purpose, it can absorb the difference in thermal expansion coefficient between the tile body 1 and the photovoltaic cell module 6, thereby maintaining the bond performance for a long period of time.

Figure 8:
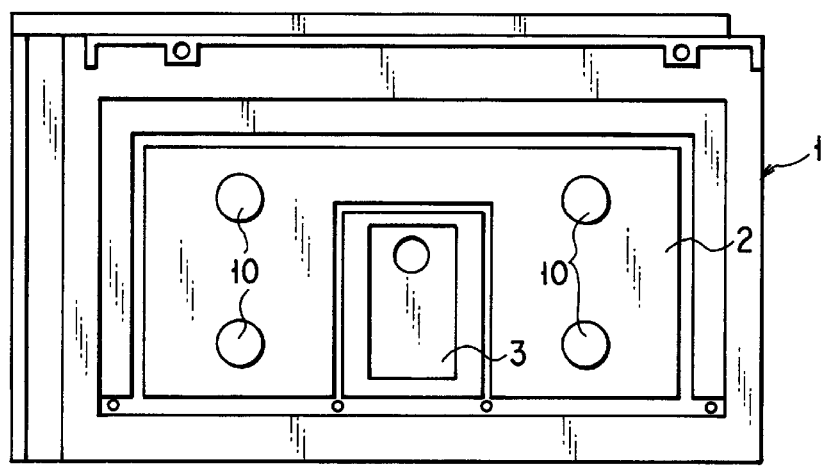
FIG. 8 is a plan view of a tile body according to a fifth embodiment of the invention.

FIG. 8 shows a fifth embodiment. According to the fourth embodiment, the substantially circular beads of the adhesive 10 are applied to the eight spots of the depression 2 that are located symmetrically with respect to the horizontal and vertical center lines O. According to the present embodiment, however, substantially circular beads of an adhesive 10 are applied to four spots of a depression 2 that are located symmetrically with respect to horizontal and vertical center lines O, and a photovoltaic cell module 6 is pressed against the depression 2 for spot bonding.

In general, the bond strength of an adhesive 10 is settled basically depending on the bond area. An experiment conducted by the inventor hereof indicates that it is more effective to apply the adhesive 10 to a plurality of spaced spots of the depression 2 for spot bonding, as in the cases of the fourth and fifth embodiments, than to apply the adhesive 10 substantially to the whole area of the base of the depression 2.

Figure 9A:
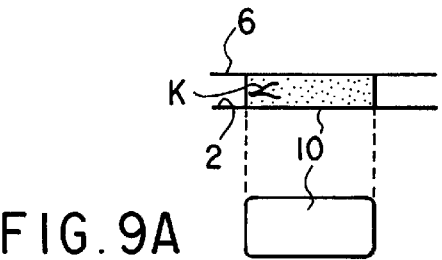
FIGS. 9A and 9B are diagrams each including a sectional view and a plan view for illustrating the bond strength of an adhesive.
Figure 9B:
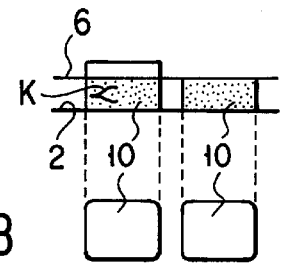

FIGS. 9A and 9B are diagrams each including a sectional view and a plan view of the adhesive 10. A bead of the adhesive 10 shown in FIG. 9A is equivalent to beads shown in FIG. 9B in both bond area and bond strength. If a crack K is formed in the bead of the adhesive 10 shown in FIG. 9A from any cause, it spreads through the bead, resulting in entirely defective bonding. In the case shown in FIG. 9B, however, a crack K in one bead of the adhesive 10 never spreads to the other bead, so that half the bond strength can be maintained. Thus, the adhesive 10 shown in FIG. 9B is more reliable.

Figure 10A:
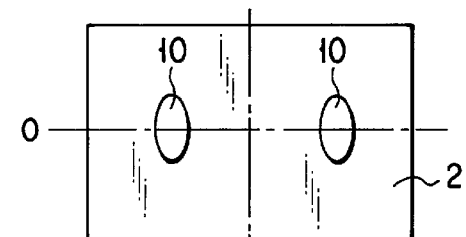
FIGS. 10A and 10B are diagrams for illustrating the bond strength of the adhesive.
Figure 10B:
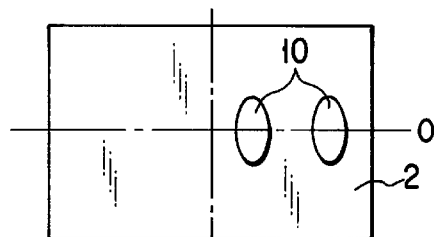

FIGS. 10A and 10B show cases where the adhesive 10 is applied to the depression 2 in consideration of the balance of bond strength. In the case shown in FIG. 10A, beads of the adhesive 10 are applied to spots that are located symmetrically with respect to horizontal and vertical centerlines O of the depression 2. In the case shown in FIG. 10B, on the other hand, the adhesive 10 is applied only to spots in the right-hand half of the depression 2. In the case of FIG. 10B, there is no bead of the adhesive 10 in the left-hand half of the depression 2, so that the photovoltaic cell module may start to separate from the left-hand side and slip off in the end. In the case of FIG. 10A, in contrast with this, the beads of the adhesive 10 are located symmetrically with respect to the horizontal and vertical center lines O of the depression 2, so that the bond strength can be maintained for a long period of time.

Thus, spot bonding is the most reliable way to fix the photovoltaic cell module 6 to the depression 2, as in the cases of the fourth and fifth embodiments. Instead of being applied to the depression 2, moreover, the adhesive 10 may be applied to the second surface of the photovoltaic cell module 6 so that the module 6 can be bonded to the depression 2 by being pressed against it.

Figure 11:
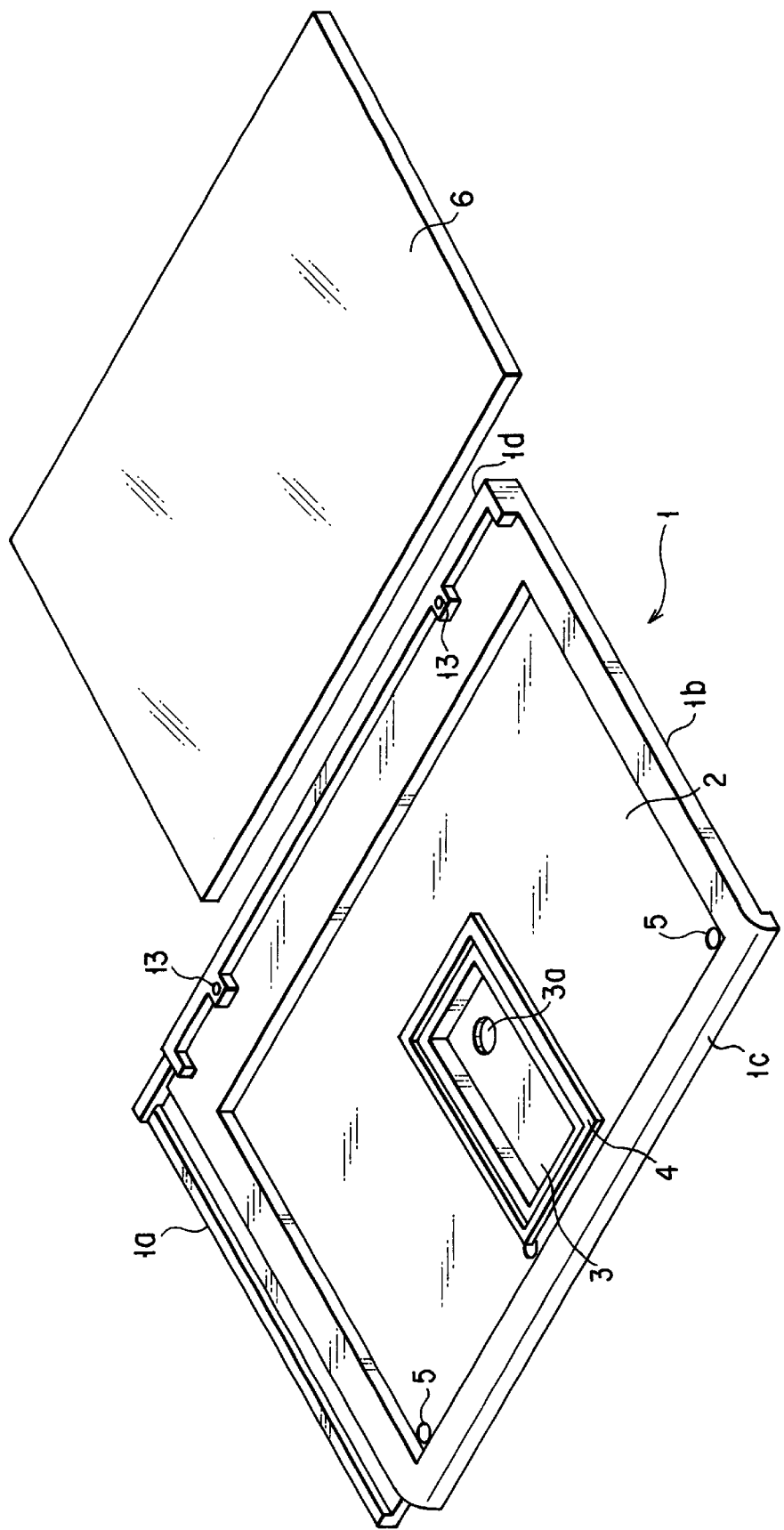
FIG. 11 is a exploded perspective view of a photovoltaic cell module tile according to a sixth embodiment of the invention.
Figure 12:
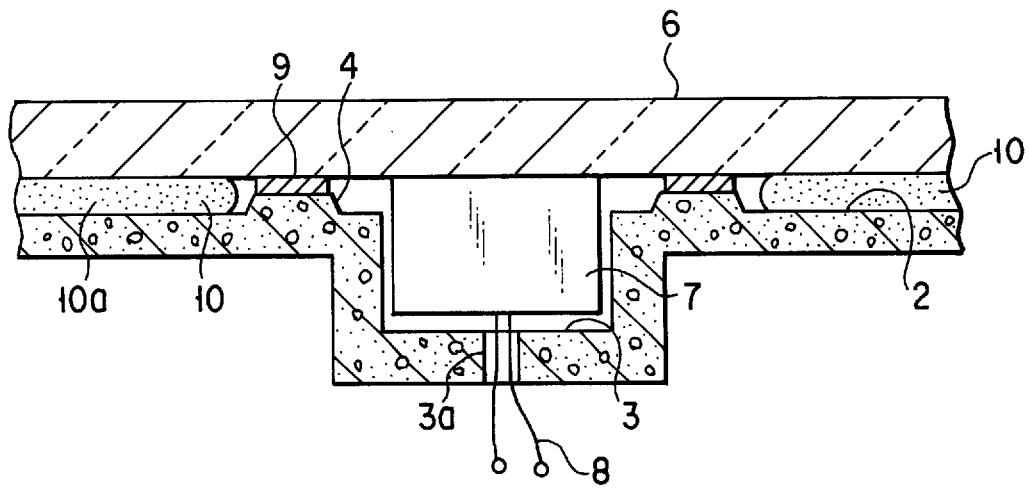
FIG. 12 is a side profile showing a part of a photovoltaic cell module tile according to the sixth embodiment.

FIGS. 11 and 12 show a sixth embodiment. In the description of the sixth embodiment to follow, like reference numerals are used to designate the same components of the first embodiment, and a description of those components is omitted. FIG. 11 is an exploded perspective view of a photovoltaic cell module tile, and FIG. 12 is a sectional view showing a photovoltaic cell module fixed to a tile body. According to the present embodiment, a rectangular breakwater 4 is formed integrally with the base of a depression 2 so as to surround a terminal box storage recess 3. The breakwater 4, which is 1 to 2 mm high, has a trapezoid cross section and a flat upper surface.

As in the case of the first embodiment, a double-coated tape 9 and an adhesive 10 are used as means for fixing a photovoltaic cell module 6 to a depression 2 of a tile body 1. The adhesive 10 is applied substantially to the whole surface of the depression 2 of the tile body 1, thereby forming an adhesive layer 10a. Further, the tape 9 is stuck to the upper surface of the breakwater 4 that surrounds the terminal box storage recess 3.

As the double-coated tape 9 is stuck to the upper surface of the breakwater 4 in this manner, the space between the base of the depression 2 and the lower surface of the photovoltaic cell module 6 can ensure the thickness of the adhesive layer 10a, so that the module 6 can be securely fixed to the tile body 1. Besides, the water stopping effect of the breakwater 4 on the depression 2 and the function of the tape 9 with the thickness of 0.5 to 1.0 mm that serves as a gasket can prevent rainwater in the depression 2 from flowing into the terminal box storage recess 3.

Figure 13:
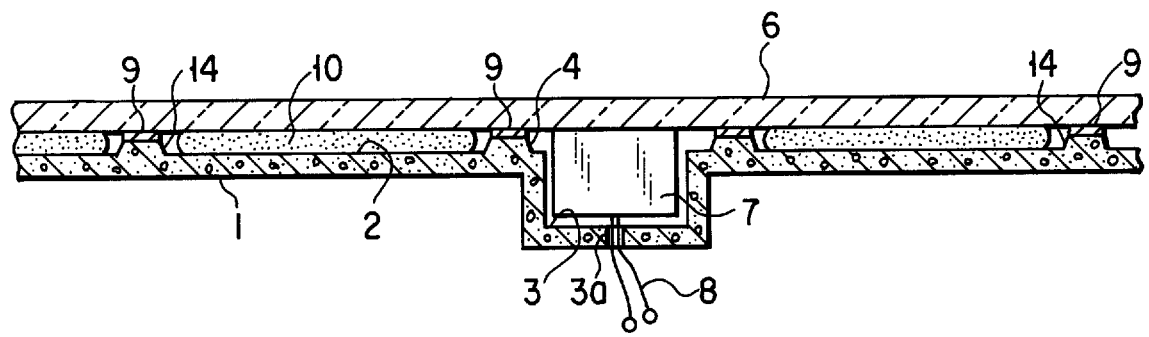
FIG. 13 is a front profile showing a part of a tile body according to a seventh embodiment of the invention.

FIG. 13 shows a seventh embodiment. In the description of the seventh embodiment to follow, like reference numerals are used to designate the same components of the sixth embodiment, and a description of those components is omitted. FIG. 13 is a sectional view showing a photovoltaic cell module fixed to a tile body. According to the present embodiment, a double-coated tape 9 is stuck to the upper surface of a breakwater 4 that surrounds a terminal box storage recess 3, breakwaters 14 are also provided individually near the opposite side portions of the base of a depression 2, and double-coated tapes 9 are stuck individually to the respective upper surfaces of the breakwaters 14. Thus, a photovoltaic cell module 6 can be fixed with stability, and the thickness of an adhesive layer 10a can be made uniform.

Figure 14:
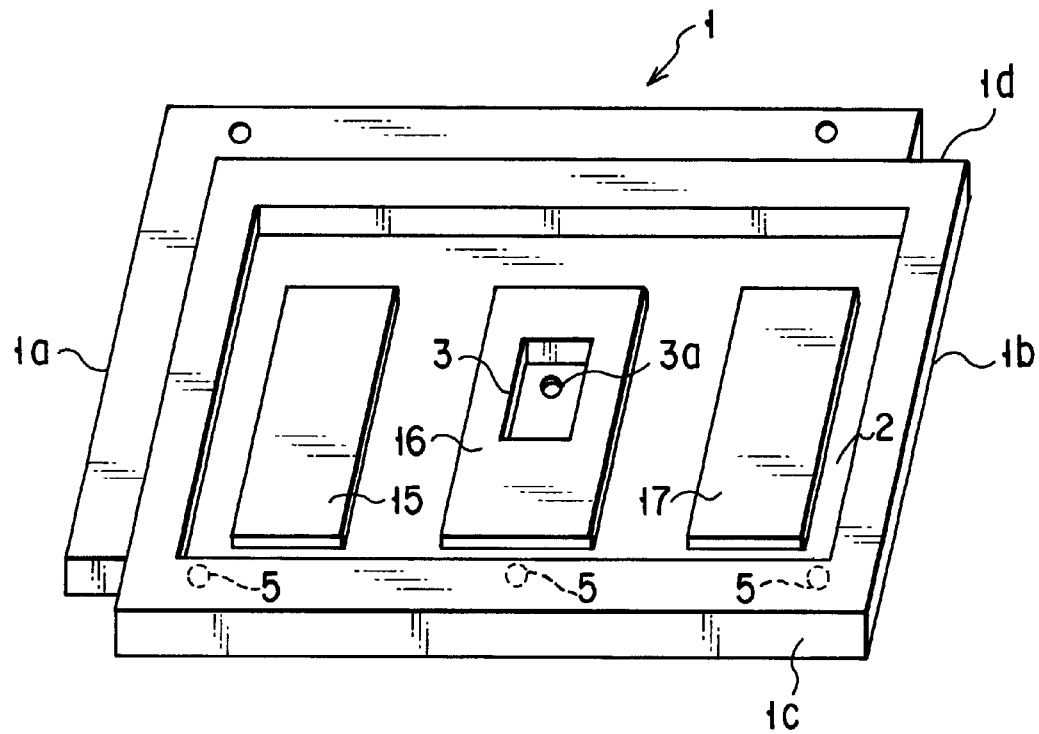
FIG. 14 is a perspective view of a tile body according to an eighth embodiment of the invention.
Figure 15:
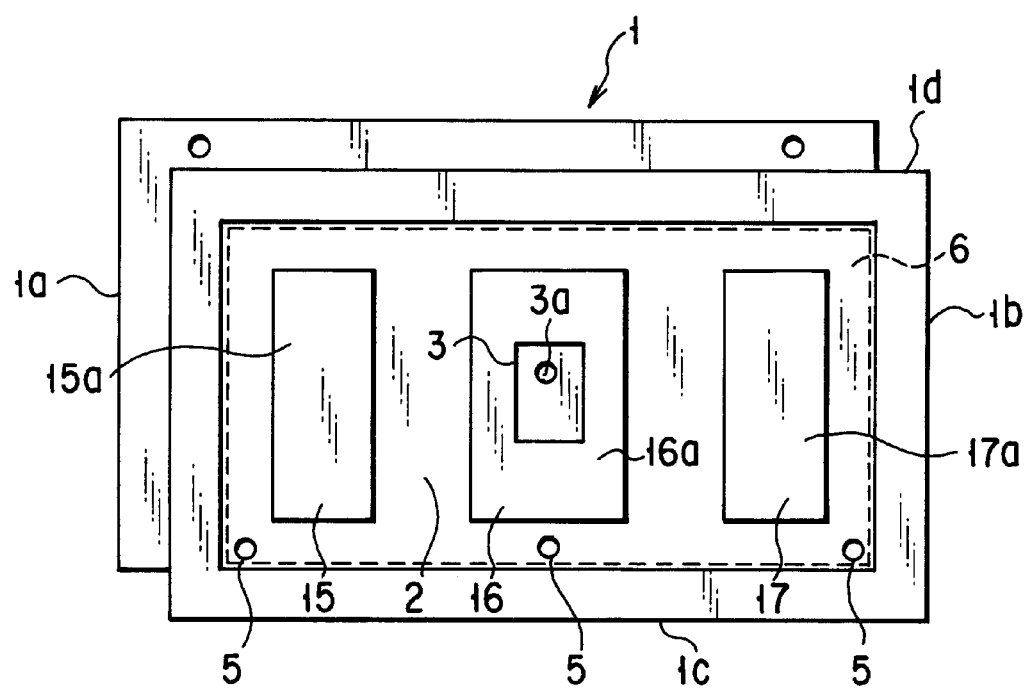
FIG. 15 is a plan view of the tile body of the eighth embodiment.

FIGS. 14 and 15 show an eighth embodiment. In the description of the eighth embodiment to follow, like reference numerals are used to designate the same components of the first embodiment, and a description of those components is omitted. FIGS. 14 and 15 are a perspective view and a plan view, respectively, of a tile body.

According to the present embodiment, three rectangular projections 15, 16 and 17 are arranged side by side in a depression 2 of a tile body 1. The respective upper surfaces of the projections 15, 16 and 17 form, respectively, bonded surfaces 15a, 16a and 17a that are butted against and bonded to the second surface of a photovoltaic cell module 6 in the depression 2. The respective bonded surfaces 15a, 16a and 17a of the three projections 15, 16 and 17 has one height such that the upper surface of the module 6 never projects above the depression 2 when the module 6 is set in the depression 2. In other words, the height of the projections 15, 16 and 17 is at least smaller than the difference between the depth of the depression 2 and the thickness of the module 6.

Thus, the level of the bonded surfaces 15a, 16a and 17a of the projections 15, 16 and 17 is a little higher than the base of the depression 2, that is, the surfaces 15a, 16a and 17a project above the base of the depression 2 to a degree such that an operator can recognize the position of application as s/he applies an adhesive to the depression 2. Accordingly, the operator can apply the adhesive only to the bonded surfaces 15a, 16a and 17a. Thus, variation of the spread of the adhesive attributable to the individuality of the operator can be restrained, and the position of application of the adhesive can be prevented from varying.

A projection 16 that is located substantially in the center of the depression 2 is provided with a rectangular terminal box storage recess 3. A cable outlet hole 3a is bored through the bottom of the storage recess 3 in a position deviated on the upper end side of the tile body 1.

As mentioned before, the bonded surfaces 15a, 16a and 17a with a fixed area are formed, respectively, on the upper surfaces of the projections 15, 16 and 17 that slightly project above the base of the depression 2 that holds the photovoltaic cell module 6. In bonding the module 6, therefore, the operator is expected only to apply the adhesive to the bonded surfaces 15a, 16a and 17a only, so that the spread and the position of application of the adhesive can be fixed. Thus, the bonding operation can be facilitated, and variations of the spread and the position of application of the adhesive attributable to the individuality of the operator can be restrained. In consequence, the state of bond can be stabilized, and uniform quality can be maintained.

The projection 16 that is located substantially in the center of the depression 2 serves as a ring-shaped projection that surrounds the terminal box storage recess 3 for holding a terminal box of the photovoltaic cell module 6. If rainwater flows into the depression 2 due to deterioration of caulking or the like, therefore, it can be prevented from flowing into the storage recess 3. Thus, the terminal box and output cables of the module 6 cannot be wetted, so that a leak or short can be prevented.

The projections 15, 16 and 17 on the base of the depression 2 are not limited to the aforesaid configuration, and may be formed in any suitable shapes. Although the central projection 16 is in the shape of a ring that surrounds the terminal box storage recess 3, for example, it need not always be ring-shaped.

Figure 16:
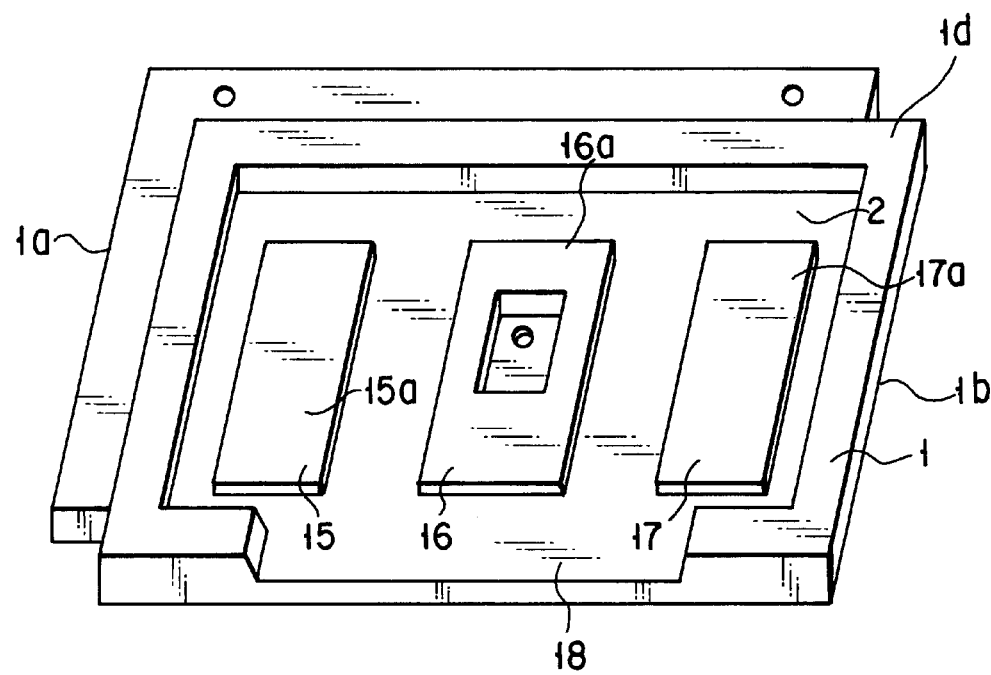
FIG. 16 is a perspective view of a tile body according to a ninth embodiment of the invention.
Figure 17:
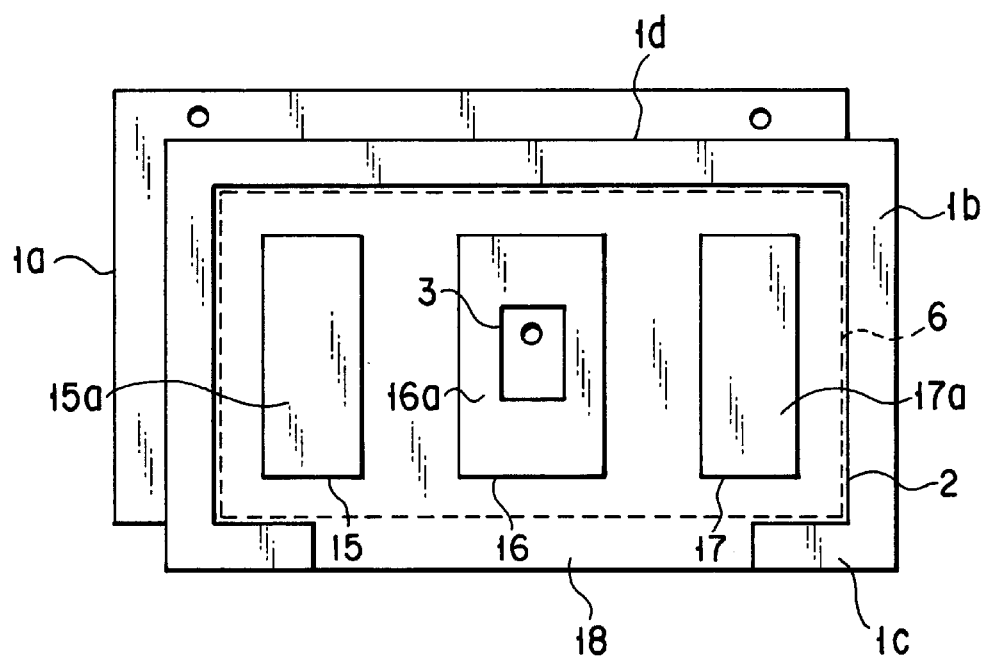
FIG. 17 is a plan view of the tile body of the ninth embodiment.

FIGS. 16 and 17 show a ninth embodiment. In the description of the ninth embodiment to follow, like reference numerals are used to designate the same components of the eighth embodiment, and a description of those components is omitted. FIGS. 16 and 17 are a perspective view and a plan view, respectively, of a tile body. According to the present embodiment, a drainage port 18 is provided in place of the drainage holes 5 of the eighth embodiments. The port 18 is formed by cutting an edge portion of a tile body 1 on the lower end portion of a depression 2.

The drainage port 18, which extends substantially covering the overall length of the lower end portion of the depression 2, is formed by cutting the lower end side of the tile body 1 to the same depth with the depression 2. If rainwater flows into the depression 2 due to deterioration of caulking or the like, therefore, it can be discharged through the drainage port 18.

Figure 18:
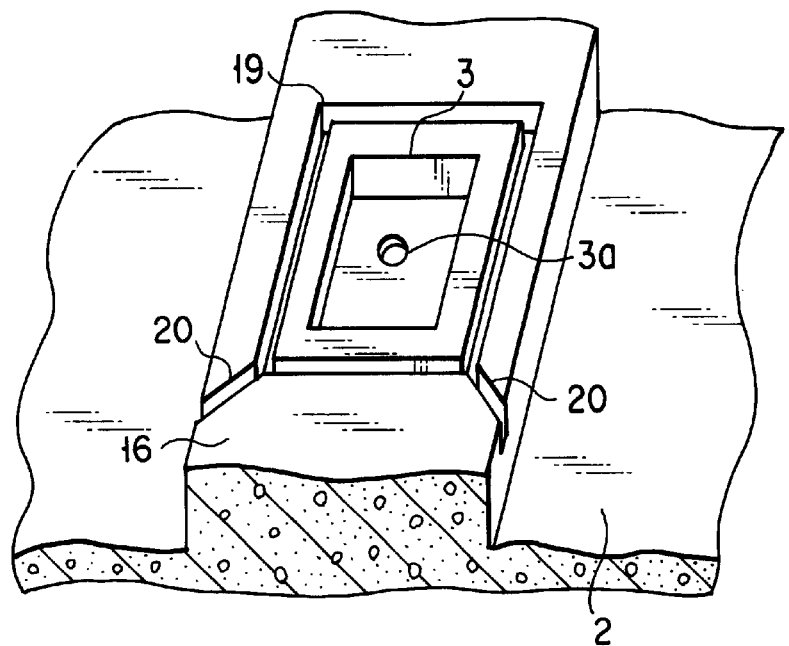
FIG. 18 is a perspective view showing a part of a tile body according to a tenth embodiment of the invention.

FIG. 18 shows a tenth embodiment. In the description of the tenth embodiment to follow, like reference numerals are used to designate the same components of the eighth and ninth embodiments, and a description of those components is omitted. FIG. 18 is a perspective view of a projection 16. According to the present embodiment, an annular groove 19 is provided to prevent water from entering a terminal box storage recess 3 from the outside. The groove 19 communicates with a depression 2 of a tile body 1 by means of a plurality of waterways 20 that are arranged on the lower end side of a tile body 1. Thus, water can be securely prevented from entering the storage recess 3 with use of the ring-shaped groove 19 that surrounds the storage recess 3.

Figure 19:
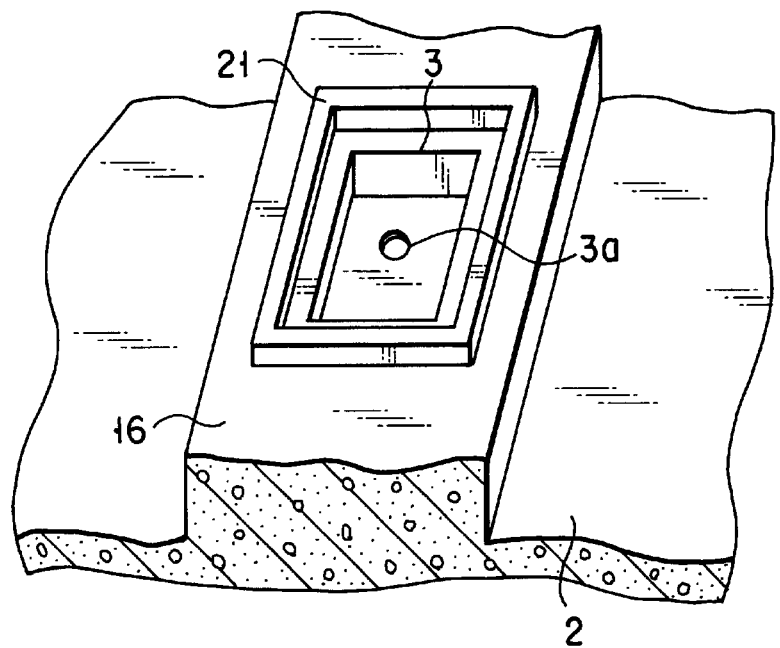
FIG. 19 is a perspective view showing a part of a tile body according to an eleventh embodiment of the invention.

FIG. 19 shows an eleventh embodiment. In the description of the eleventh embodiment to follow, like reference numerals are used to designate the same components of the tenth embodiment, and a description of those components is omitted. FIG. 19 is a perspective view of a projection 16. According to the present embodiment, an annular groove 21 is provided to prevent water from entering a terminal box storage recess 3 from the outside. Thus, water can be securely prevented from entering the storage recess 3 with use of the ring-shaped groove 21 that surrounds the storage recess 3.

Figure 20:
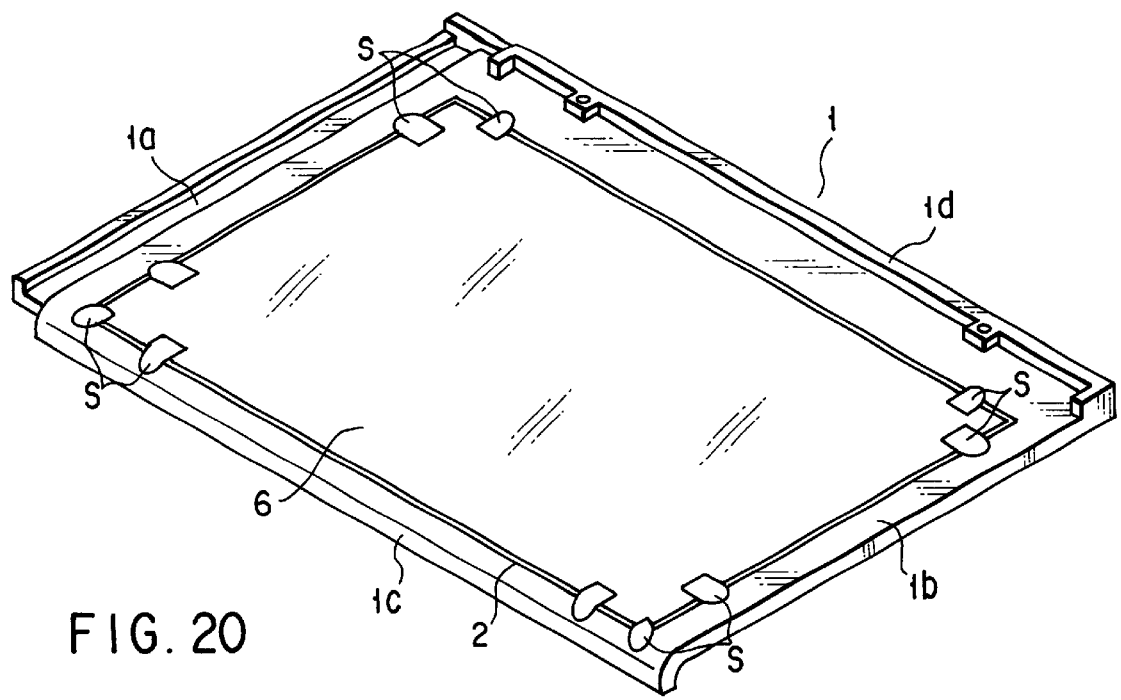
FIG. 20 is a perspective view of a photovoltaic cell module tile according to a twelfth embodiment of the invention.
Figure 21:
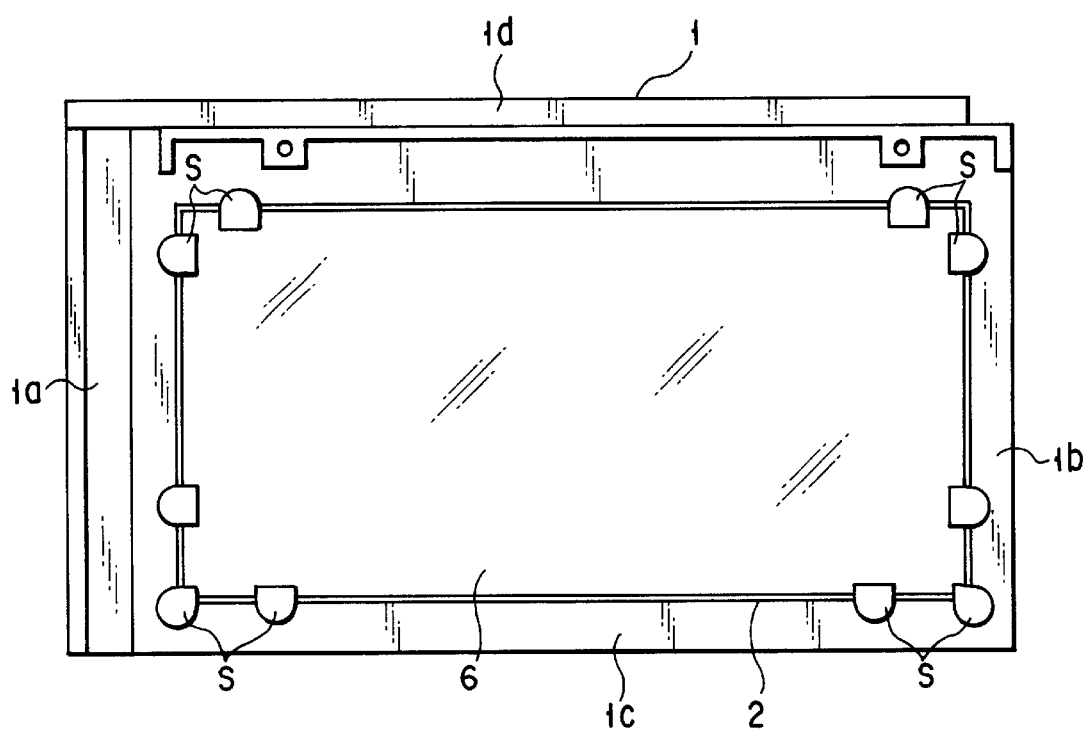
FIG. 21 is a plan view of the photovoltaic cell module tile of the twelfth embodiment.
Figure 22:
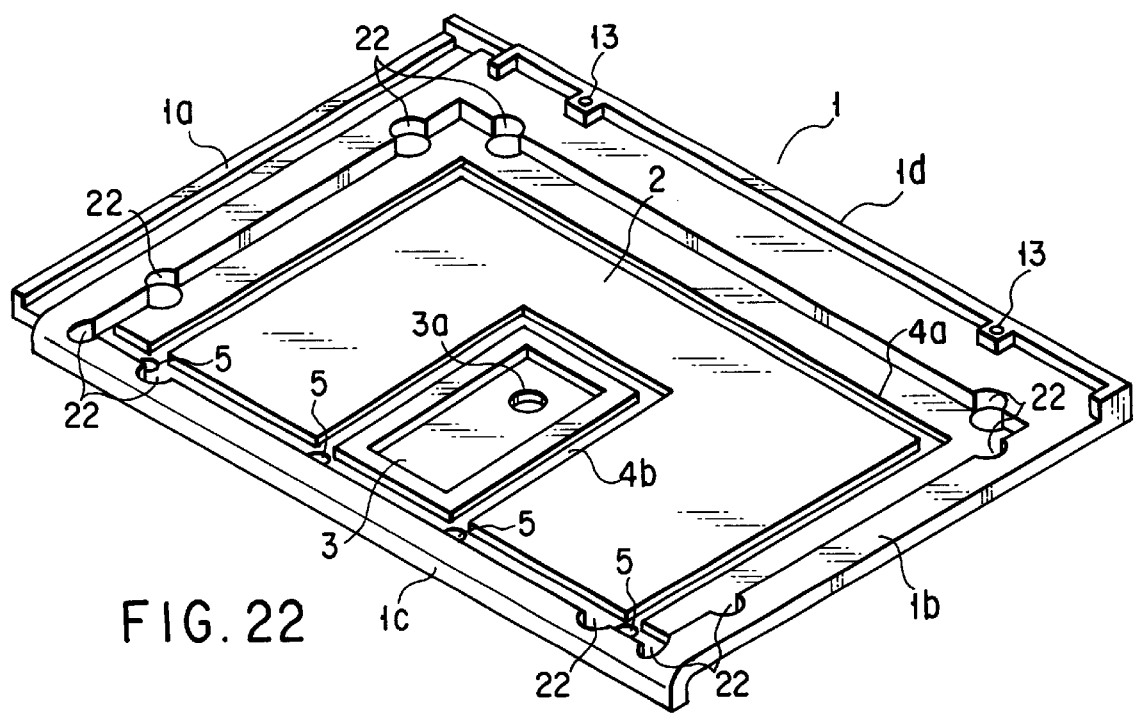
FIG. 22 is a perspective view of a tile body according to the twelfth embodiment.
Figure 23:
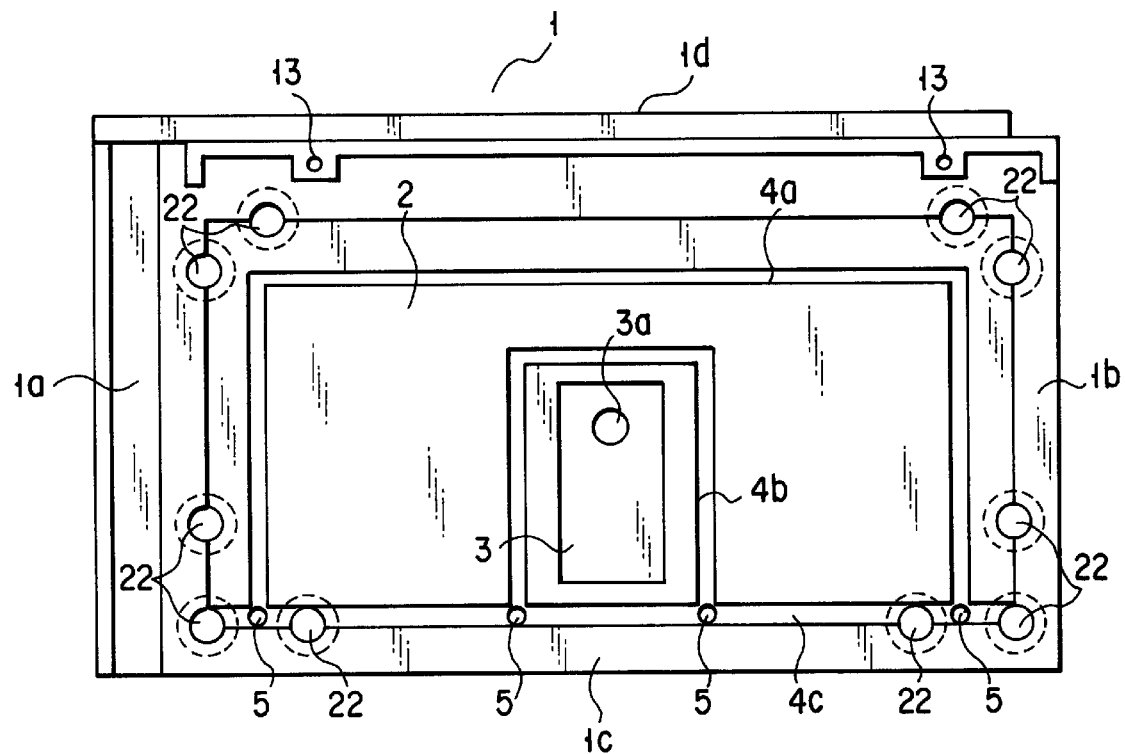
FIG. 23 is a plan view of the tile body of the twelfth embodiment.

FIGS. 20 to 26 show a twelfth embodiment. In the description of the twelfth embodiment to follow, like reference numerals are used to designate the same components of the first embodiment, and a description of those components is omitted. FIGS. 20 and 21 are a perspective view and a plan view, respectively, of a photovoltaic cell module tile. FIGS. 21 and 22 are a plan view and a perspective view, respectively, of a tile body.

A photovoltaic cell module 6 is attached to a tile body 1 by means of an adhesive that is applied to the base of a depression 2 of the tile body 1. This attachment, however, is only tight enough to prevent dislocation. Lift preventing means (mentioned later) is used securely to prevent a photovoltaic cell module 6 from lifting from the tile body 1.

More specifically, a plurality of adhesive holes 22 are arranged in predetermined positions on the peripheral edge of the depression 2 of the tile body 1. The holes 22 are located in the opposite side corner portions of the eave side, on the eave side and the opposite sides near the corner portions, and on the ridgeline side and the opposite sides near the opposite corner portions on the ridgeline side. Each adhesive hole 22 is a circular hole that is formed of a semicircular hole having its center on the peripheral edge of the depression 2 and bored in the upper surface of the tile body 1 outside the depression 2 and another semicircular hole continuous with the depression 2.

Adhesive holes 22 penetrate the tile body 1 from top to bottom. Each hole 22 has a small diameter φd that ranges from the first surface of the tile body 1 to a region beyond the base of the depression 2 and a large diameter φD that ranges from the lower end edge to the second surface through a tapered portion.

Figure 24A:
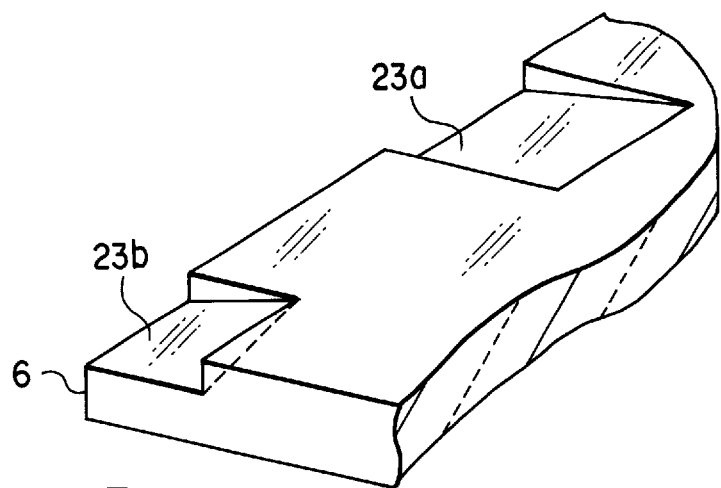
FIG. 24A is a partial perspective view of a photovoltaic cell module according to the twelfth embodiment.

As shown in FIG. 24A, on the other hand, notches or slopes 23a and 23b are formed in those portions of the upper surface of the photovoltaic cell module 6 which are opposed to the adhesive holes 22 when the module 6 is fitted in the depression 2.

Figure 24B:
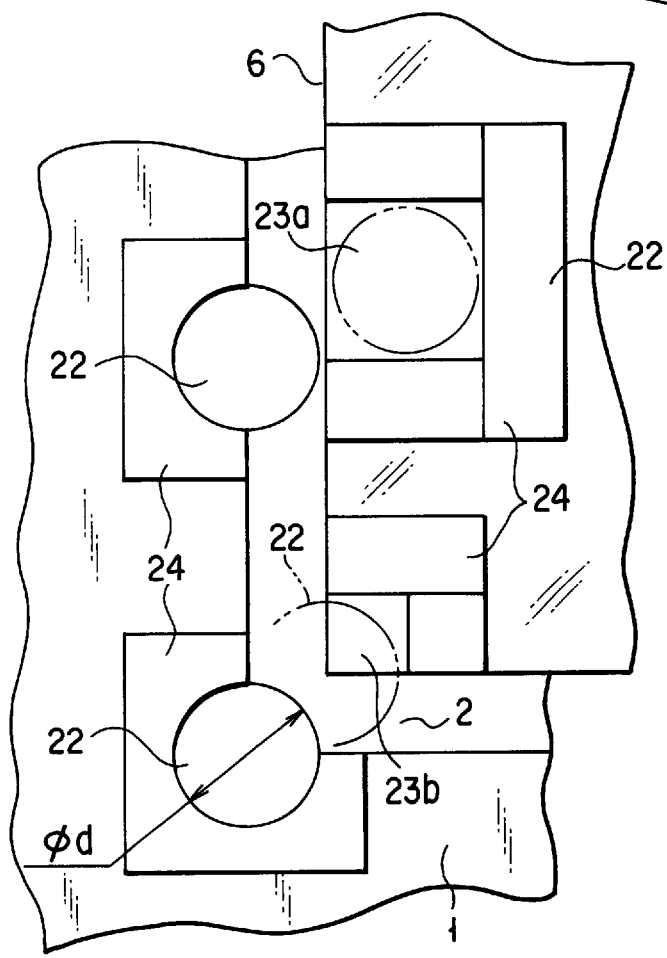
FIG. 24B is a partial plan view showing the way the photovoltaic cell module of the twelfth embodiment is bonded to the tile body.

As shown in FIG. 24B, each of the slopes 23a that are located individually on all the side portions except both eave-side corner portions of the photovoltaic cell module 6 has vertical and horizontal dimensions that are substantially equal to the diameter φd of the adhesive holes 22 on the small-diameter side. Each slope 23a is inclined from its inner part toward its peripheral edge. Each of the slopes 23b at the opposite eave-side corner portions is inclined from its rectangular edges toward its angles.

Figure 25:
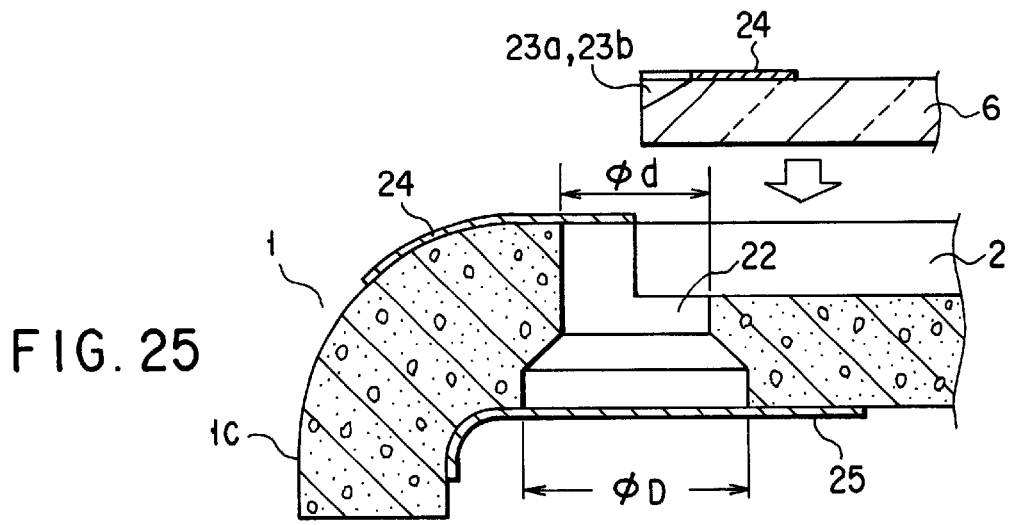
FIG. 25 is a partial sectional view showing the way the photovoltaic cell module of the twelfth embodiment is bonded to the tile body.

As shown in FIGS. 24B and 25, masking tapes 24 are stuck beforehand to the respective peripheral edges of the adhesive holes 22 in the upper surface of the tile body 1, except the edge portions on the depression side, and the respective peripheral edges of the slopes 23a and 23b on the upper surface of the photovoltaic cell module 6, respectively. Further, a masking tape 25 is stuck to each adhesive hole 22 on the reverse side of the tile body 1, whereby the bottom opening of each hole 22 is closed.

If the photovoltaic cell module 6 is fitted into the depression 2 in this state, the adhesive holes 22 and the peripheral surface and base of the depression 2 are closed by the photovoltaic cell module 6. However, the upper surface of the tile body 1 outside the depression 2 is exposed and opposed to the slopes 23a and 23b of the module 6. The masking tapes 24 that are stuck to adhesive holes 22 on the tile body side are also opposed individually to the masking tapes 25 around the slopes 23a and 23b.

In this state, an adhesive S is injected in- or onto the open adhesive holes 22 and slopes 23a and 23b. The adhesive S may be a silicon-based adhesive, for example. Since the respective bottoms of the holes 22 on the reverse side of the tile body 1 are closed by means of the masking tapes 25, individually, the adhesive S collects in or on the holes 22 and the slopes 23a and 23b without a leakage.

When the adhesive S is set after it is left to stand for a given period of time, the masking tapes 24 and 25 are separated. If the adhesive S swells out around the adhesive holes 22 and the slopes 23a and 23b, for example, therefore, it never fails to collect on the masking tapes 24. Accordingly, the swollen adhesive S can be removed as the tapes 24 are separated.

Figure 24C:
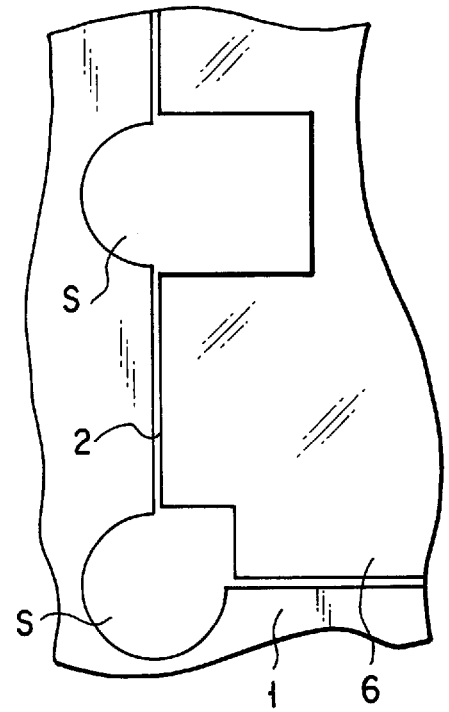
FIG. 24C is a partial plan view showing the photovoltaic cell module of the twelfth embodiment fixed to the tile body by bonding.
Figure 26:
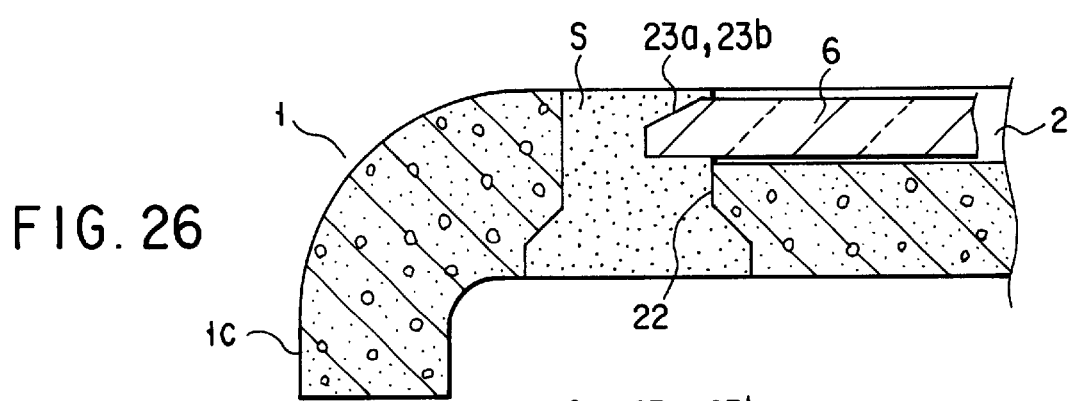
FIG. 26 is a partial sectional view showing the photovoltaic cell module of the twelfth embodiment fixed to the tile body by bonding.

As shown in FIGS. 24C and 26, therefore, the photovoltaic cell module 6 is fixedly attached to the tile body 1 by means of the adhesive S. Based on the shape of each adhesive hole 22, the upper end portion of the cross section of the loaded adhesive S is in the form of a semicircle with the small diameter φd, and the lower end portion has the large diameter φD. The intermediate portion between the upper and lower end portions is tapered.

Thus, the set adhesive S has an anchor-shaped cross section such that it cannot be drawn out upward. If the photovoltaic cell module 6 is urged to lift above the tile body 1 by a strong wind, the adhesive S can produce an anchor effect such that it can be anchored to the tile body 1 as long as it is bonded to the module 6 with a given strength.

When a photovoltaic cell module tile was experimentally fanned by a strong wind of 60 m/sec, a force (wind pressure) of about 10 kg/cm$^2$ acted on the photovoltaic cell module 6, thereby urging the module 6 to lift.

The set adhesive S has the anchor effect that is high enough to resist the wind pressure of this level, and can securely function when it is only provided on the eave side at the least. Since the adhesive S is loaded onto the slopes 23a and 23b on the surface of the photovoltaic cell module 6, thereby depressing the module 6 from above, the module 6 can be prevented further securely from lifting.

Figure 27:
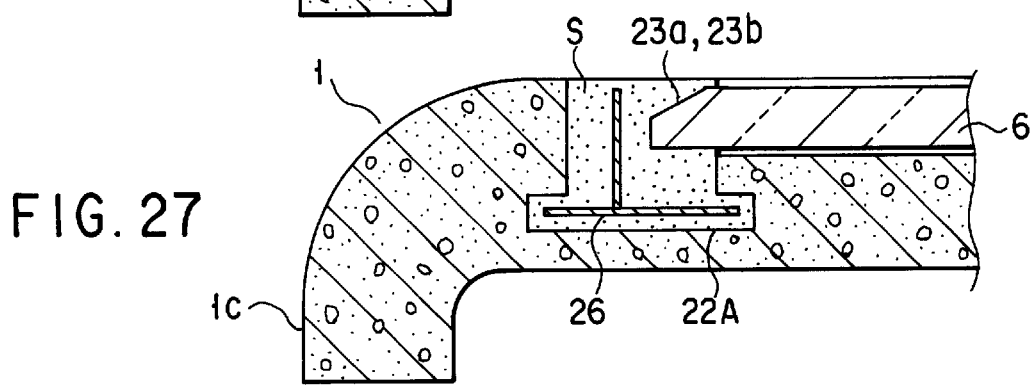
FIG. 27 is a partial sectional view showing a photovoltaic cell module according to a thirteenth embodiment fixed to a tile body by bonding.

FIG. 27 shows a thirteenth embodiment. In the description of the thirteenth embodiment to follow, like reference numerals are used to designate the same components of the twelfth embodiment, and a description of those components is omitted. It is to be understood, in this case, that the lower part of each adhesive hole 22A below a depression 2 has a diameter larger than that of the upper part on the upper surface side of a tile body 1. Each hole 22A has its bottom at a given distance from the lower surface of the tile body 1 so that it is closed. Thus, an adhesive S can be injected into each adhesive hole 22A without the trouble of previously closing the bottom open end of each adhesive hole 22 with the aforesaid masking tape 25.

The adhesive hole 22A is not provided with any taper portion such as the aforesaid one. However, it is stepped and includes small- and large-diameter portions, so that the set adhesive can also ensure the anchor effect. Since the adhesive S is loaded onto slopes 23a and 23b on the upper surface of a photovoltaic cell module 6, the module 6 can be prevented further securely from lifting.

Moreover, a core 26 such as a wire is disposed in the central portion of the adhesive hole 22A before the adhesive S is injected into the hole 22A and set therein. The core 26 serves as an insert member that can increase the stiffness of the adhesive S.

Figure 28:
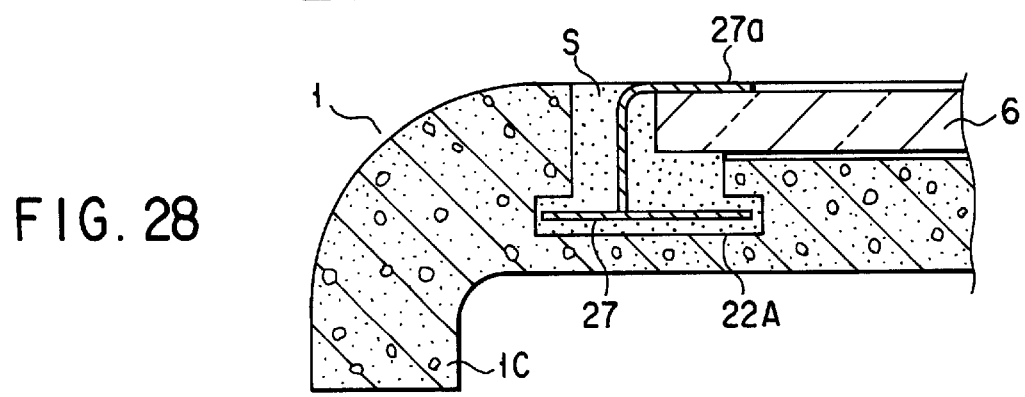
FIG. 28 is a partial sectional view showing a photovoltaic cell module according to a fourteenth fixed to a tile body by bonding.

FIG. 28 shows a fourteenth embodiment. In the description of the fourteenth embodiment to follow, like reference numerals are used to designate the same components of the thirteenth embodiment, and a description of those components is omitted. An adhesive hole 22A in a tile body 1 is identical with the one according to the thirteenth embodiment. The same anchor effect as aforesaid can be obtained by injecting an adhesive S into the adhesive hole 22A after disposing a core 27 such as a wire in the central portion of the hole 22A.

Further, the core 27 is bent along the upper surface of a photovoltaic cell module 6, and the resulting bent portion 27a serves to press down the module 6. Accordingly, the upper surface of the module 6 need not be provided with the slopes 23a and 23b that have previously been described in connection with the twelfth and thirteenth embodiments.

Alternatively, the core 26 or 27, formed of a wire, may be located in each adhesive hole 22 of the twelfth embodiment. Use of the core 27 obviates the necessity of the slopes of the photovoltaic cell module 6.

Furthermore, each adhesive hole 22 is supposed to be a circular hole that combines a semicircular hole on the tile body side and another semicircular hole on the depression side. Alternatively, however, each adhesive hole 22 may be rectangular without any hindrance. The slopes 23a and 23b for use as notches may be replaced with simple steps.

Thus, according to the twelfth to fourteenth embodiments, the anchor effect may be used to prevent the photovoltaic cell module from lifting from the tile body, so that the reliability and safety of the module can be improved. Further, the core that serves as the insert member for the adhesive can increase the strength of the adhesive. The bent portion of the insert member can directly press down the photovoltaic cell module, thereby more securely preventing it from lifting.

Figure 29:
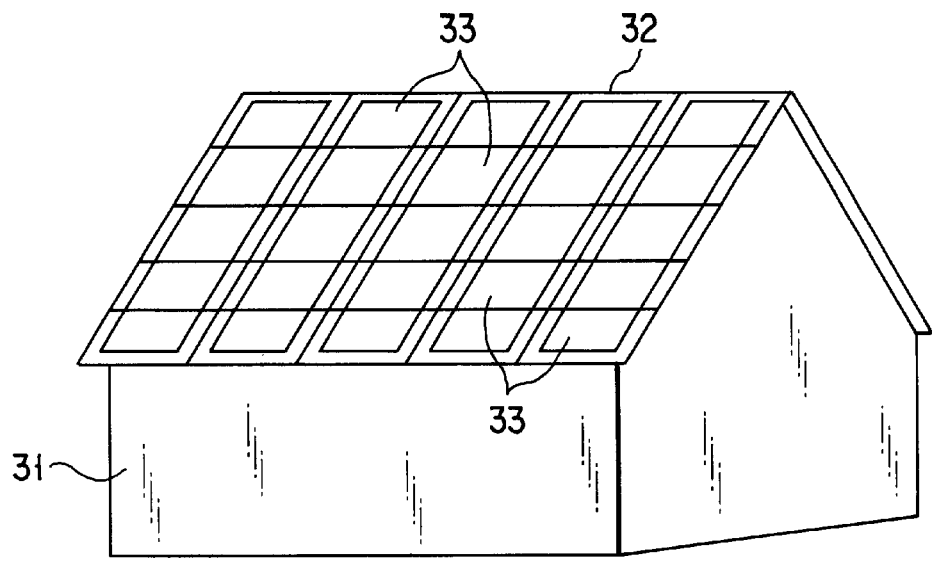
FIG. 29 is a perspective view schematically showing a building roofed with photovoltaic cell module tiles according to a fifteenth embodiment.
Figure 30:
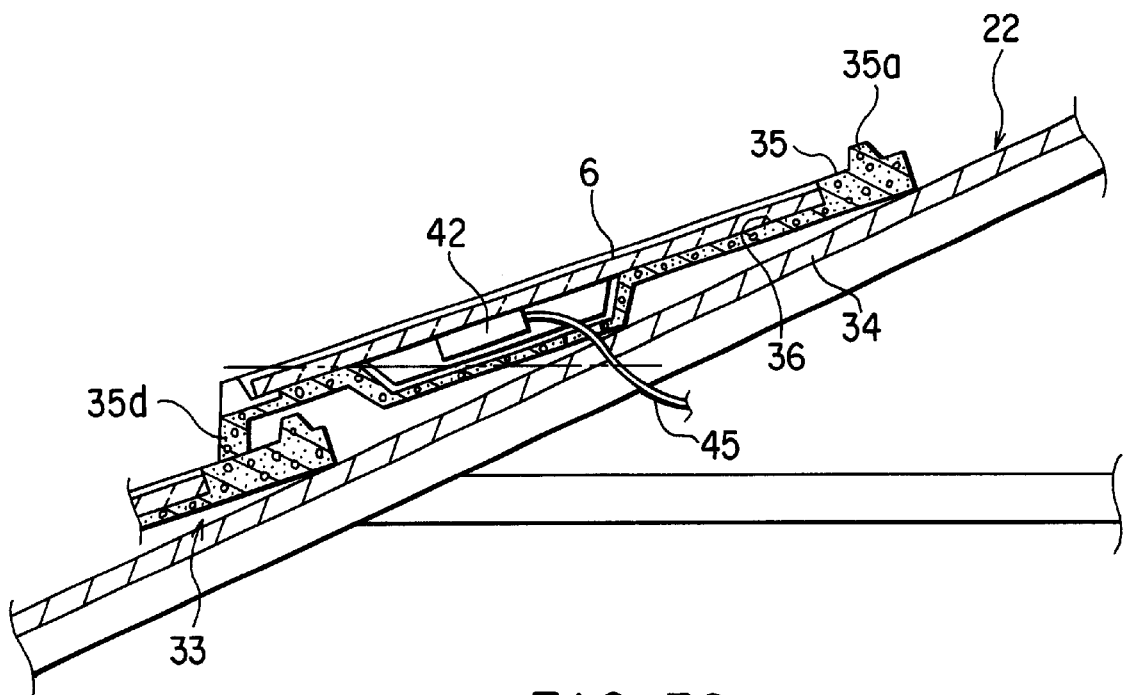
FIG. 30 is a sectional view showing a part of a roof of the building shown in FIG. 29.

FIGS. 29 to 36 show a fifteenth embodiment. FIG. 29 shows a building 31. A roof 32 of the building 31 is provided with a large number of photovoltaic cell module tiles 33 for use as roofing materials, which are laid in the ridgeline-eave direction and arranged lengthwise and crosswise. As shown in FIG. 30, a sheathing 34 of the roof 32 declines from the ridgeline side of the roof 32 toward the eave side.

Each photovoltaic cell module tile 33 is formed of a tile body 35 and the same photovoltaic cell module 6 of the first embodiment that is held in and bonded to a depression 36 in the upper surface of the tile body 35.

Figure 31:
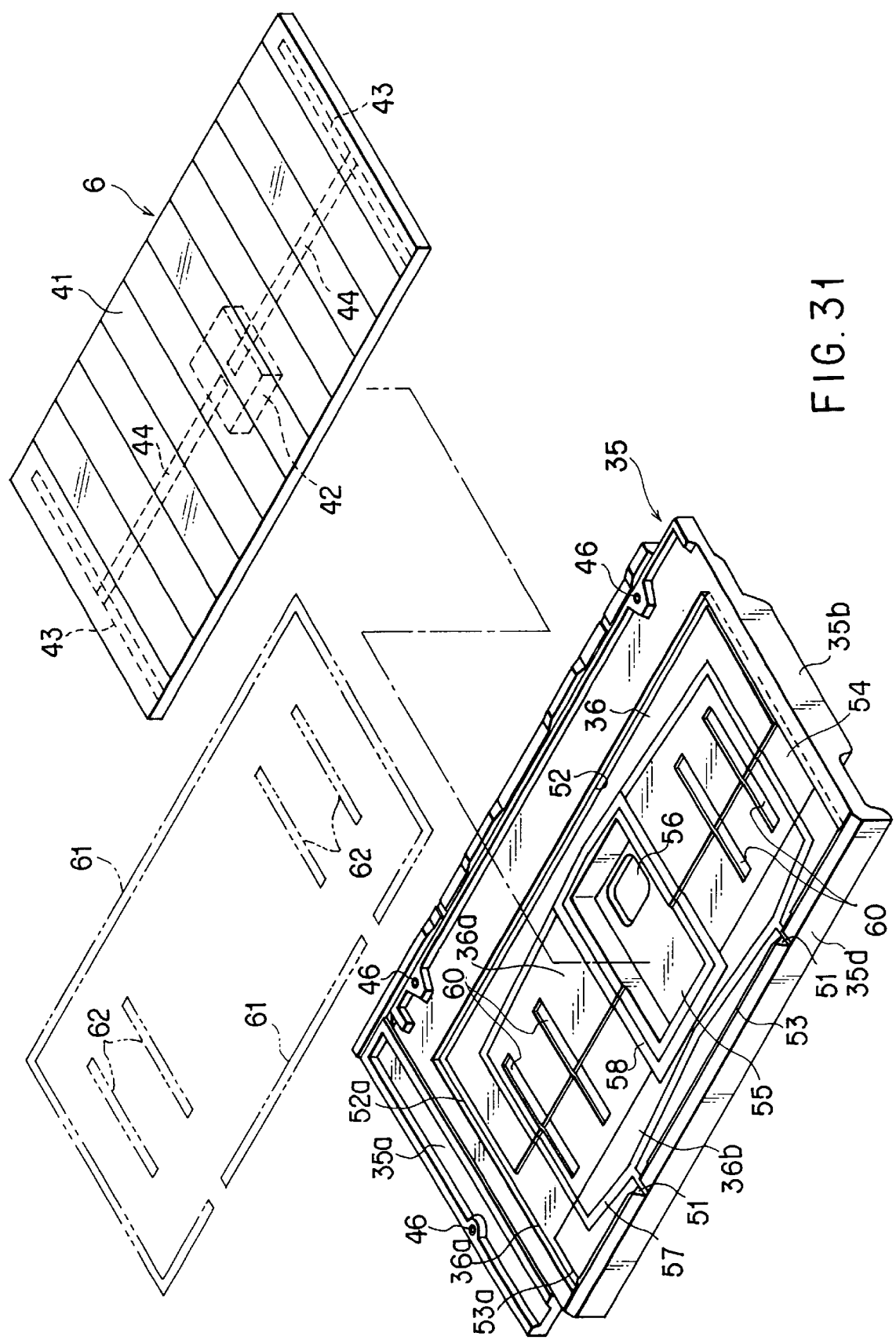
FIG. 31 is an exploded perspective view of the photovoltaic cell module tile of the fifteenth embodiment.

As shown in FIG. 31, the photovoltaic cell module 6 is designed so that a terminal box 42 is bonded to the second surface (opposite a front face as a light incident surface) of a module body 41 in its substantially central portion with respect to the transverse direction.

The module body 41 includes a transparent glass substrate, a plurality of amorphous silicon cells for use as semiconductor layers, which are formed on the second surface of the substrate and connected in series with one another for photovoltaic power generation, and a pair of busbars 43 for use as positive and negative electrodes, which are arranged individually on the opposite sides of the cells and connected electrically to the cells. The module body 41 further includes a pair of output wires 44 that electrically connect the busbars 43 and the terminal box 42, a filler (not shown) that is put on the reverse side of the transparent substrate so as to seal most of the wires 44, the cells, and the busbars 43, and a protection sheet (not shown) on the filler. Output cables 45 (see FIG. 30) are led out through the top side of the terminal box 42.

The cells and the busbars 43 extend parallel to one another in the ridgeline-eave direction of the roof 32. The output wires 44 are connected at right angles to the busbars 43 and extend in the transverse direction of the module body 41. The distal end of each wire 44 is bent to the reverse side of the module body 41, penetrates the filler and the protection sheet, and is connected to a terminal fitting (not shown) in the terminal box 42. Those portions of the second surface of the module body 41 which correspond to the respective positions of the busbars 43 somewhat bulge when compared to the other second surface portions.

As shown in FIGS. 31 and 32, the tile body 35 is a substantially rectangular flat plate that is formed of, for example, a cement tile. Overlap portions 35a and 35b, for use as left- and right-hand side edge portions, are formed individually on the transversely opposite side portions of the tile body 35. The overlap portions 35a and 35b can mate with laterally adjacent tile bodies 35 of the roof 32, individually. A rear rising portion 35c is provided on the upper side edge portion of the tile body 35, and a front hanging portion 35d, bent downward, is provided on the lower side edge portion of the tile body 35.

As shown in FIG. 30, the front hanging portion 35d of an upper tile body 35, out of each two adjacent tile bodies 35 that are arranged in the vertical direction (ridgeline-eave direction) of the roof 32, is lapped on the upper surface of the rear rising portion 35c of a lower tile body 35. The tile bodies 35 are laid over the sheathing 34 directly or with a tile ground such as roofing between them. In FIG. 31, numeral 46 denotes each of fixing holes through which tile fittings, such as nails or screws, are passed.

In tiling the roof 32 in a manner such that the photovoltaic cell module tiles 33 are placed on the sheathing 34, as in the case of conventional tiling operation, the module tiles 33 are laid on the sheathing 34 from the eave side toward the ridgeline side, and are fixed to the sheathing 34 with nails or the like passed through the fixing holes 46. The overlap portions 35a and 35b of each two laterally adjacent tile bodies 35 are joined by fitting, and the front hanging portion 35d of each ridgeline-side tile body 35 is put on the rear rising portion 35c of each eave-side tile body 35.

The roof 32 can be formed by repeatedly laying the photovoltaic cell module tiles 33 in this manner. During this tiling operation, the output cables 45 led out of the terminal box 42 are connected in series or parallel with each other so that a plurality of photovoltaic cell modules 37 are connected electrically to one another. Output ends obtained by this connection are connected to lead-in cables (not shown) or the like that are led into the building.

Figures 32A, 32B:
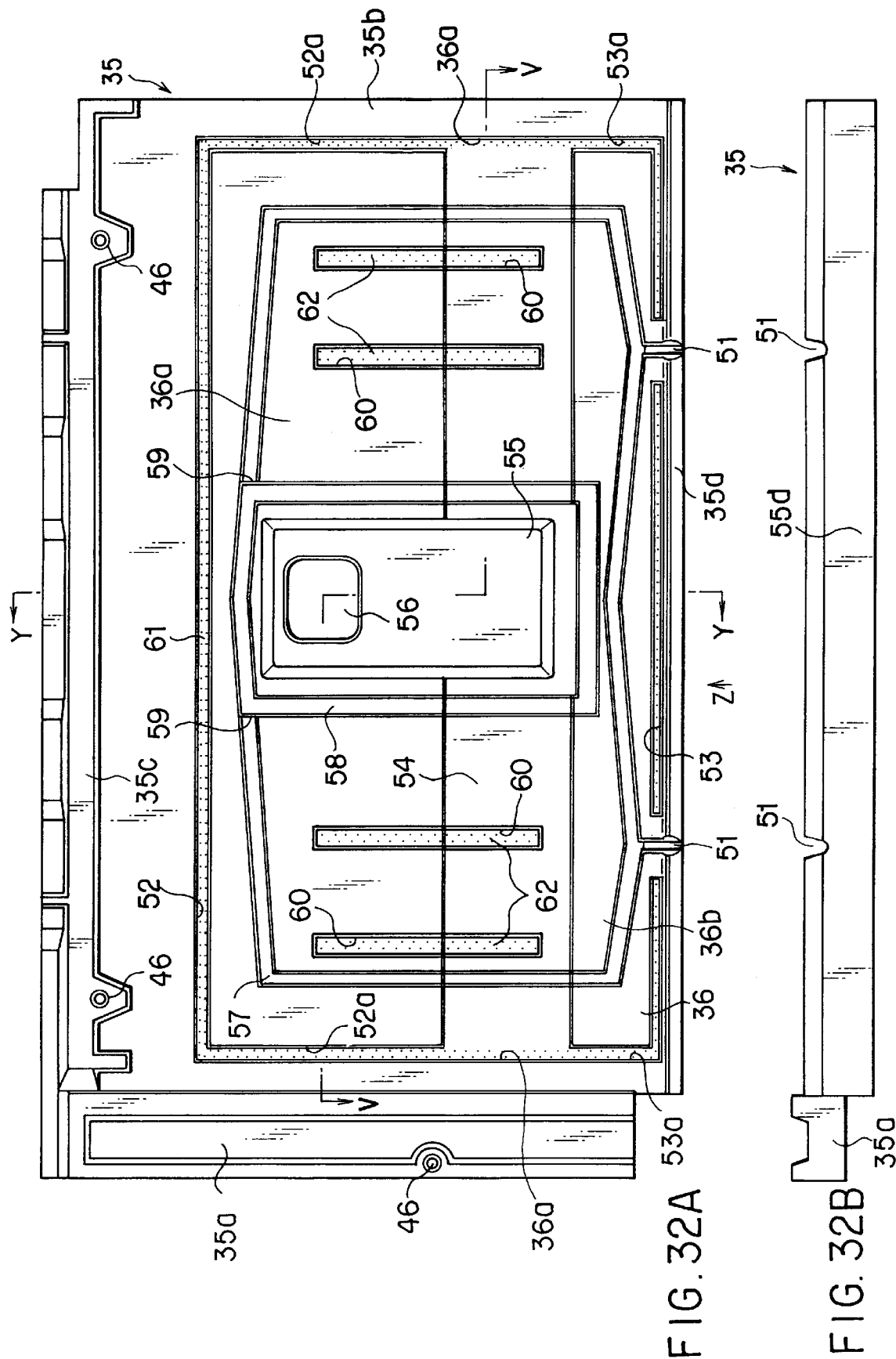
FIGS. 32A and 32B are a plan view and a front view, respectively, showing a tile body of the photovoltaic cell module tile of the fifteenth embodiment.
Figure 33:
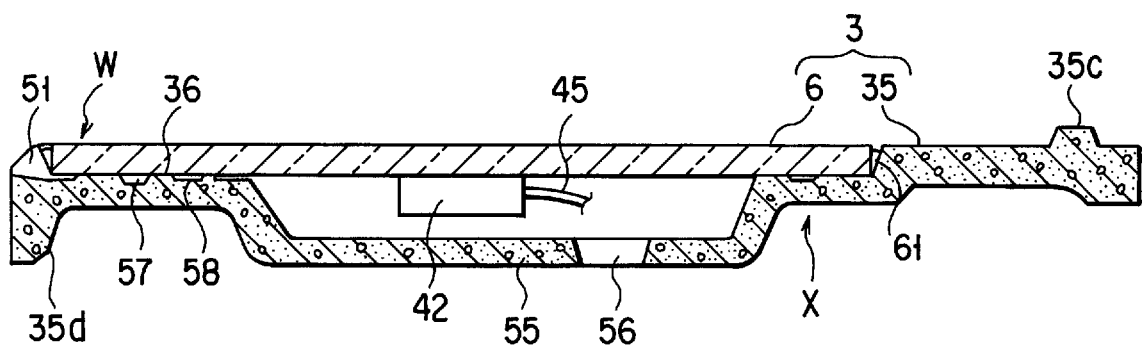
FIG. 33 is a sectional view taken along line Y—Y of FIG. 32A.
Figure 34:
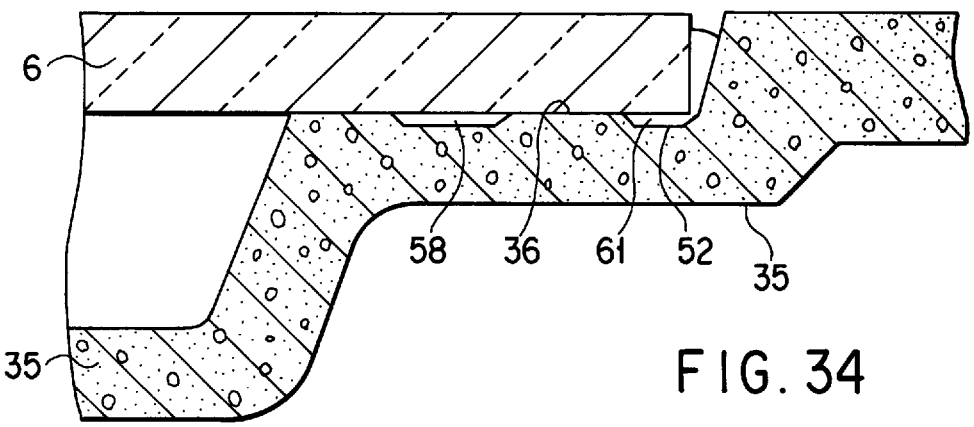
FIG. 34 is an enlarged sectional view of a section X shown in FIG. 33.
Figure 35:
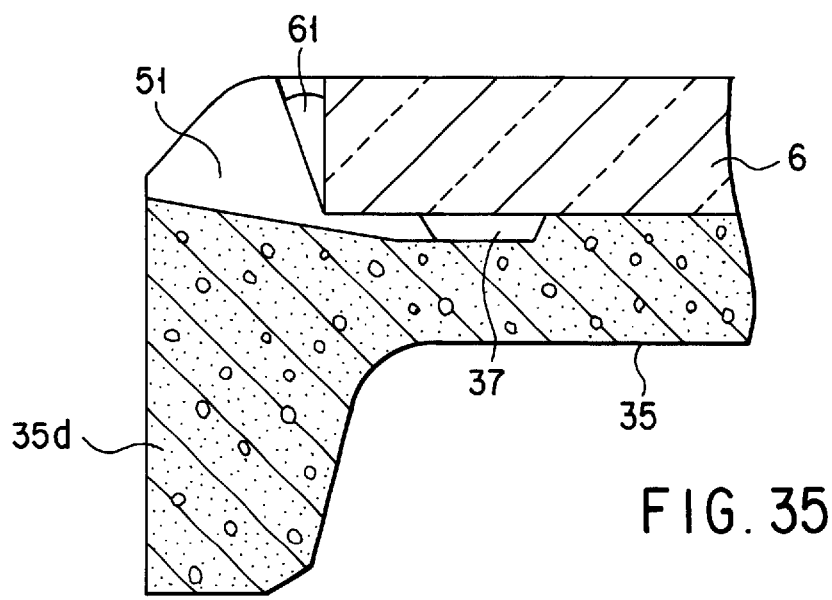
FIG. 35 is an enlarged sectional view showing a portion including a waterway in a section W shown in FIG. 33.

The rectangular depression 36, which is formed covering the greater part of the upper surface of each tile body 35, is surrounded by the edge portions of the tile body 35, that is, by the side edge portions 35a and 35b, rear rising portion 35c, and front hanging portion 35d that are continuous with one another. The depression 36 has a depth a little greater than the thickness of the photovoltaic cell module 6. One or more waterways, e.g., a pair of waterways 51, left and right, are formed in the lower side edge portion of the tile body 35. As shown in FIGS. 32A, 32B and 35, each waterway 51 has its top and both ends open and communicates with the depression 36. Further, it leads to the outer end face of the lower side edge portion of the tile body 35, and its base is continuous with the base of the depression 36. If rainwater enters the depression 36, therefore, it can be discharged onto the directly underlying photovoltaic cell module tile 33 via the waterways 51 and the outer end face of the lower side edge portion of the tile body 35.

The depression 36 is provided with measures constructed in the manner shown in FIGS. 31 to 36, whereby the photovoltaic cell module 6 is fixed and the terminal box 42 is waterproofed.

More specifically, the depression 36 is formed having an upper groove 52 that extends continuously along the upper edge portion and upper opposite side edges of the depression 36 and a lower groove 53 that extends continuously along the lower edge portion and lower opposite side edges, the grooves 52 and 53 being vertically separated from each other. That portion of the lower grove 53 which extends along the lower side edge portion is discontinuous, divided in two positions where the waterways 51 cross the groove 53. For example, each of the grooves 52 and 53 is about 1 mm deep, and its base is about 4 mm wide.

A stepped recess 54 is defined between an upper inside portion 36a surrounded in three directions by the upper groove 52 and a lower inside portion 36b surrounded in three directions by the lower groove 53. The stepped recess 54 extends in the transverse direction of the depression 36, and its base is flush with the base of a groove portion 52a of the upper groove 52 that extends along opposite side edges 36c of the depression 36 and the base of a groove portion 53a of the lower groove 53 that extends along the opposite side edges 36c of the depression 36. The recess 54 can receive projections of the output wires 44 of the photovoltaic cell module 6 held in the depression 36.

A box storage recess 55 vertically extends in the central portion of the depression 36 with respect to the transverse direction, stretching over the upper and lower inside portions 36a and 36b. The recess 55 divides the stepped recess 54 in two, left and right. The box storage recess 55 is situated in the lowest part of the depression 36. More specifically, the upper part of the recess 55 on the ridgeline side is situated in a region surrounded by the upper groove 52, that is, in the upper inside portion 36a. A wire aperture 56 opens in the upper bottom wall of the recess 55. The recess 55 holds therein the terminal box 42 of the photovoltaic cell module 6, and the output cables 45 led out upward (or toward the ridgeline) from the box 42 are dawn out through the wire aperture 56.

The depression 36 is formed having an annular ditch 57 that is situated between its peripheral edges and the box storage recess 55 and continuously surrounds the periphery of the recess 55. The ditch 57 is formed extending across the stepped recess 54 and covering the upper and lower inside portions 36a and 36b. The lower ditch portion of the ditch 57 communicates with the waterways 51. Further, the depression 36 is formed having an annular groove 58 that is situated inside the ditch 57 and continuously surrounds the recess 55 in the vicinity of it. For example, the ditch 57 is about 2 mm deep, and its base is about 6 mm wide. The annular groove 58 is about 2 mm deep, and its base is about 6 mm wide, for example.

An upper groove portion of the annular groove 58 is shared with the central portion of an upper groove portion of the ditch 57, and a partition wall 59 divides these groove portions. If rainwater is blown into the ditch 57 through the waterways 51, the partition wall 59 can prevent the rainwater from getting into the annular groove 58 near the box storage recess 55 and consequently reaching the recess 55.

The depression 36 is formed having one or more (e.g., two) adhesive pits 60 that are situated between the box storage recess 55 and the opposite side edges 36c and in the inside portion of the depression 36 surrounded by the ditch 57. Each of the pits 60 is formed covering the upper inside portion 36a and the stepped recess 54 and extending in the vertical direction (ridgeline-eave direction). For example, each adhesive pit 60 is about 1 mm deep, and its base is about 10 mm wide.

The photovoltaic cell module 6 is held in and fixed to the depression 36 of the aforesaid construction in the following manner. More specifically, a sealant 61 is loaded substantially in a ring, covering the upper and lower grooves 52 and 53 and the opposite end portions of the stepped recess 54 continuous with the groove portions 52a and 53a. The sealant 61 bonds the second surface of the peripheral edge portion of the photovoltaic cell module 6 in the depression 36. The sealant 61 used is a silicone- or silicon-based material that remains elastic after it is set. A silicon-loaded polyisobutylene-based sealant is a preferred material for the purpose. Since the polyisobutylene-based sealant contains no low-molecular silicone component, there is no possibility of any low-molecular component blurring or darkening the respective surfaces of the tile body 35 and the photovoltaic cell module 6.

Further, the adhesive pits 60 are loaded with an adhesive 62, whereby a plurality of portions of the photovoltaic cell module 6 in the depression 36 are bonded. The adhesive 62 is higher in bond performance than the sealant 61. It may be formed of a material that sets in a bonded state after the start of use. According to the present embodiment, however, the adhesive 62 is an epoxy-based adhesive that remains elastic in a bonded state after the start of use.

Thus, the photovoltaic cell module 6 stored in and bonded to the depression 36 can be held securely and steadily with use of the sealant 61 and the adhesive 62 in combination.

In the bonding operation using the sealant 61 and the adhesive 62, moreover, the second surface portion of the photovoltaic cell module 6, which somewhat projects concealing the output wires 44, is set in the stepped recess 54 of the depression 36. Therefore, there is no possibility of the photovoltaic cell module 6 being somewhat inclined around the projection. Thus, the module 6 can be supported in an appropriate attitude as it is held in and bonded to the depression 36 with its flat second surface in contact with the respective flat surfaces of the upper and lower inside portions 36a and 36b. In consequence, the degree of contact with the sealant 61 and the adhesive 62 easily becomes uniform throughout the area, so that the sealant 61 can fulfill its desired seal performance and bond performance substantially throughout the peripheral edge of the depression 36. Moreover, the adhesive 62 can fulfill its bond performance for the second surface of the photovoltaic cell module 6.

According to the photovoltaic cell module tile 33 constructed in this manner, the sealing effect of the sealant 61 prevents rainwater from entering the depression 36 of the tile body 35. In this case, the sealant 61 in the upper groove 52 of the depression 36, in particular, surrounds the upper part of the box storage recess 55, having therein the terminal box 42 on the second surface of the photovoltaic cell module 6, from the top side and opposite lateral sides. Thus, the sealing effect of the sealant 61 can prevent rainwater from entering the recess 55 from the top side or some other sides.

If the sealing operation is improper or if the quality of the sealant 61 is lowered, however, rainwater may possibly get into the depression 36. In such a case, however, the rainwater in the depression 36 can be discharged to the eave side from the outer end face of the lower side edge portion of the tile body 35 through the waterways 51. In this case, the waterways 51 connect the outer end face of the lower side edge portion of the tile body 35 and the depression 36 without penetrating the tile body 35 in the thickness direction. If there is dust between each two vertically overlapping tile bodies that adjoin each other in the ridgeline-eave direction, therefore, the rainwater can be smoothly discharged through the waterways 51 that are situated above the dusty region. Thus, the rainwater in the depression 36 can be prevented from being directed toward the terminal box 42.

For this drainage, the depression 36 has therein the ditch 57 that continuously surrounds the box storage recess 55, and the ditch 57 communicates with the waterways 51.

Therefore, rainwater having entered the depression 36 and urged to move toward the terminal box 42 can be caught by means of the ditch 57 and quickly guided downward along the inclination of the roof 32. Thus, the rainwater flowing down the ditch 57 can be easily discharged from the depression 36 through the waterways 51. In this manner also, the rainwater in the depression 36 can be prevented from being directed toward the terminal box 42.

Since the adhesive 62 that serves mainly to bond the photovoltaic cell module 6 to the depression 36 vertically extends in, for example, straight lines between the opposite side edges 36c of the depression 36 and the box storage recess 55, it can be utilized as breakwater means. Accordingly, rainwater having entered the depression 36 through the opposite side edges 36c or the like can be prevented from reaching the recess 55. In this manner also, the rainwater in the depression 36 can be prevented from being directed toward the terminal box 42.

Since the adhesive 62 is located in the inside portions that are surrounded by the ditch 57, moreover, the rows of the adhesive 62 in the adhesive pits 60 can be prevented from being exposed to rainwater by the agency of the ditch 57 that quickly discharges the rainwater. Thus, the adhesive 62 can be restrained from lowering its quality and can maintain reliable bond performance for a long period of time.

If necessary, according to the present embodiment, the annular groove 58 can be also loaded with the sealant 61. If this is done, the adhesion of the photovoltaic cell module 6 to the depression 36 can be enhanced, and waterproofness for the box storage recess 55 can be improved. Since the groove 58 is divided from the ditch 57, moreover, rainwater can never get into the groove 58 through the ditch 57.

Thus, the waterproof effect at the various parts and the drainage effect of the waterways 51 can prevent rainwater in the depression 36 from being directed toward the terminal box 42, and therefore, eliminate the possibility of an electrical short or leak in the box 42.

The terminal box 42 is located above the highest water level (indicated by two-dot chain line in FIG. 30) for the recess 55, and the wire aperture 56 above the box 42. If the waterproof performance is ruined to allow rainwater temporarily to collect in the box storage recess 55, therefore, the box 42 cannot be exposed to the rainwater in the recess 55. Thus, an electrical short or leak can be prevented, and there is no possibility of the rainwater flowing out to the reverse side of the tile body 35 through the wire aperture 56 and wetting an attic.

Thus, according to the present embodiment, rainwater in the depression, if any, can be quickly discharged from the depression through the waterways, so that its adverse effect on the terminal box can be suppressed. If the rainwater in the depression temporarily collects in the lower part of the box storage recess, moreover, there is no possibility of the rainwater flowing out to the reverse side of the tile body through the wire aperture in the upper part of the recess.

Further, the annular ditch allows rainwater, having entered the depression through its peripheral edges, to be quickly discharged through the waterways, and prevents the adhesive in the adhesive pits from being exposed to the rainwater in the depression. Thus, the adhesive can be restrained from lowering its quality.

Furthermore, the photovoltaic cell module can be held in and bonded to the depression in an appropriate posture lest the module be somewhat inclined due to projections corresponding to the output wires on the second surface of the module. Thus, the sealant or the like can fulfill its desired seal performance.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A photovoltaic cell module tile comprising:

a tile body;

a depression provided in the upper surface of the tile body; and a photovoltaic cell module having a terminal box on the lower surface thereof fixed to the base of the depression with an adhesive applied thereto.

2. A photovoltaic cell module tile according to claim 1, wherein said adhesive is applied to the whole area of the base of the depression.

3. A photovoltaic cell module tile according to claim 1, wherein said adhesive is applied partially to the base of the depression.

4. A photovoltaic cell module tile according to claim 1, wherein said adhesive is applied to a plurality of spaced spots on the upper surface of the depression of the tile body and/or the second surface of the photovoltaic cell module so that the photovoltaic cell module is fixed to the depression by spot bonding.

5. A photovoltaic cell module tile according to claim 4, wherein said spots of application of the adhesive are spaced so that beads of the adhesive on the spots never touch one another when the photovoltaic cell module is pressed against the depression of the tile body.

6. A photovoltaic cell module tile according to claim 4, wherein said spots of application of the adhesive are located symmetrically in the horizontal and vertical directions of the depression of the tile body.

7. A photovoltaic cell module tile according to claim 1, which further comprises an adhesive hole formed in the outer peripheral edge portion of the depression so as to be continuous with the depression, and wherein the adhesive is anchored to the outer peripheral edge portion of the photovoltaic cell module when the adhesive injected into the adhesive hole is set.

8. A photovoltaic cell module tile according to claim 7, wherein said photovoltaic cell module is provided with a notch in the surface of an end portion thereof opposite to the adhesive hole, the notch being designed to be loaded with some of the adhesive.

9. A photovoltaic cell module tile according to claim 7, which further comprises an insert member disposed in the adhesive hole and serving as a core for the adhesive injected in the adhesive hole.

10. A photovoltaic cell module tile according to claim 1, which further comprises a terminal box storage recess for holding the terminal box in the depression of the tile body and a breakwater formed in the depression so as to surround the terminal box storage recess.

11. A photovoltaic cell module tile according to claim 10, wherein said photovoltaic cell module is tacked to the tile body by means of a double-coated tape stuck to the upper surface of the breakwater.

12. A photovoltaic cell module tile comprising:

a tile body;

a depression provided in the upper surface of the tile body; and a photovoltaic cell module having a terminal box on the lower surface thereof fixed to the upper surface of the depression by means of a double-coated tape and an adhesive.

13. A photovoltaic cell module tile according to claim 12, wherein said double-coated tape is stuck to that portion of the lower surface of the photovoltaic cell module which corresponds to the periphery of the terminal box, thereby tacking the tile body and the photovoltaic cell module to each other, and said adhesive is used to fix other portions.

14. A photovoltaic cell module tile according to claim 12, wherein that portion of said depression to which the double-coated tape is stuck is provided with a raised portion more prominent than other portions of the depression.

15. A photovoltaic cell module tile according to claim 12, wherein said depression of the tile body has a plurality of projections on the upper surface thereof, the respective upper surfaces of the projections serving as bonded surfaces of the photovoltaic cell module.

16. A photovoltaic cell module tile according to claim 15, wherein each said projection is provided with a terminal box storage recess for holding the terminal box.

17. A photovoltaic cell module tile comprising:

a tile body;

a depression provided in the upper surface of the tile body;

an adhesive pit provided in the depression;

a groove continuously extending along at least the upper edge and the opposite side edges of the upper part of the depression; and a photovoltaic cell module fixedly bonded to the depression in a manner such that an adhesive is applied to the adhesive pit and a sealant is loaded into the groove.

* * * * *